(12) United States Patent
Wilson et al.

(10) Patent No.: US 11,599,582 B1
(45) Date of Patent: Mar. 7, 2023

(54) COMPUTER NETWORKS

(71) Applicant: EXEMPT ME NOW, INC., New Orleans, LA (US)

(72) Inventors: Sevetri Wilson, New Orleans, LA (US); Blue Thomas, New Orleans, LA (US); Brett Grau, New Orleans, LA (US); Dinesh Nadar, New Orleans, LA (US)

(73) Assignee: EXEMPT ME NOW, INC., New Orleans, LA (US)

( * ) Notice: Subject to any disclaimer, the term of this patent is extended or adjusted under 35 U.S.C. 154(b) by 0 days.

(21) Appl. No.: 17/877,631

(22) Filed: Jul. 29, 2022

Related U.S. Application Data

(63) Continuation-in-part of application No. 17/697,678, filed on Mar. 17, 2022, now Pat. No. 11,483,411, which is a continuation-in-part of application No. 17/697,697, filed on Mar. 17, 2022, now Pat. No. 11,467,707, which is a continuation-in-part of application No. 17/697,715, filed on Mar. 17, 2022, now Pat. No. 11,483,216.

(60) Provisional application No. 63/252,144, filed on Oct. 4, 2021.

(51) Int. Cl.
*G06F 16/907* (2019.01)
*H04L 67/306* (2022.01)
*G06F 16/50* (2019.01)
*G06F 16/901* (2019.01)

(52) U.S. Cl.
CPC .......... *G06F 16/907* (2019.01); *G06F 16/50* (2019.01); *G06F 16/901* (2019.01); *H04L 67/306* (2013.01)

(58) Field of Classification Search
CPC ...... G06F 16/907; G06F 16/901; G06F 16/50; H04L 67/306
See application file for complete search history.

(56) References Cited

U.S. PATENT DOCUMENTS

| | | | |
|---|---|---|---|
| 8,827,799 B1 * | 9/2014 | Brown | A63F 13/335 463/40 |
| 10,810,361 B1 * | 10/2020 | Venkatraman | H04L 63/0421 |
| 10,871,878 B1 * | 12/2020 | Mody | G06F 16/26 |
| 11,438,341 B1 * | 9/2022 | Allen | G06Q 50/01 |
| 2005/0033669 A1 * | 2/2005 | Stremler | G06Q 40/04 705/30 |
| 2008/0288374 A1 * | 11/2008 | Stremler | G06Q 30/0279 705/30 |
| 2011/0099102 A1 * | 4/2011 | Leffew | G06Q 40/02 705/329 |

(Continued)

*Primary Examiner* — Anil K Bhargava
(74) *Attorney, Agent, or Firm* — FisherBroyles, LLP; James J. Pohl

(57) ABSTRACT

The disclosed method may include (i) aggregating, within a group network application, program user accounts registered to perform a respective task defined in a database of the group network application with resource user accounts registered as sources to provide resources for performance of the respective task, (ii) provisioning an interface that enables a program user account to select a structure for a metadata publication from a set of predefined structures, (iii) fulfilling at least part of the metadata publication based on an instruction from the program user account, and (iv) publishing the metadata publication over a wide area network in accordance with the instruction from the program user account.

20 Claims, 34 Drawing Sheets

(56) References Cited

U.S. PATENT DOCUMENTS

| | | | |
|---|---|---|---|
| 2012/0311497 A1* | 12/2012 | Bear | G06F 3/0488 715/823 |
| 2013/0018777 A1* | 1/2013 | Klein | G06Q 40/02 705/38 |
| 2013/0151432 A1* | 6/2013 | Kashner | G06Q 40/02 705/329 |
| 2013/0304645 A1* | 11/2013 | Shank | G06Q 20/28 705/42 |
| 2013/0318004 A1* | 11/2013 | Bass | G06F 3/04845 705/36 R |
| 2014/0067702 A1* | 3/2014 | Rathod | G06Q 50/01 705/319 |
| 2014/0136381 A1* | 5/2014 | Joseph | G06Q 40/02 705/35 |
| 2014/0279694 A1* | 9/2014 | Gauger | G06Q 40/06 705/36 R |
| 2015/0032652 A1* | 1/2015 | Brandes | G06Q 30/0279 705/319 |
| 2015/0264093 A1* | 9/2015 | Madisch | G06Q 10/101 715/753 |
| 2015/0278779 A1* | 10/2015 | Pfeifer | G06Q 20/384 705/39 |
| 2016/0162172 A1* | 6/2016 | Rathod | G06F 9/451 715/747 |
| 2016/0275436 A1* | 9/2016 | Kurjanowicz | G06Q 10/06398 |
| 2019/0319995 A1* | 10/2019 | Madisch | H04L 65/403 |
| 2020/0118179 A1* | 4/2020 | Kliewer | G06Q 30/0255 |
| 2020/0142573 A1* | 5/2020 | Rathod | G06F 9/451 |
| 2020/0142931 A1* | 5/2020 | Acheatel | G06Q 50/22 |
| 2020/0387299 A1* | 12/2020 | Rathod | G06F 3/04847 |
| 2021/0217042 A1* | 7/2021 | Bodo | G06Q 30/0226 |
| 2021/0326409 A1* | 10/2021 | Bose | G06F 21/00 |
| 2022/0035519 A1* | 2/2022 | Rathod | G06F 3/0481 |
| 2022/0043563 A1* | 2/2022 | Rathod | G06F 3/04847 |

* cited by examiner

COMPUTER NETWORKS

CROSS-REFERENCE TO RELATED APPLICATION(S)

This application claims the benefit, as a continuation-in-part, of application Ser. No. 17/697,678, filed Mar. 17, 2022, and titled "IMPROVED COMPUTER NETWORKS," application Ser. No. 17/697,697, filed Mar. 17, 2022, and titled "IMPROVED COMPUTER NETWORKS," application Ser. No. 17/697,715, filed Mar. 17, 2022, and titled "IMPROVED COMPUTER NETWORKS." Each of these applications, as well as this application, claims priority to provisional application 63/252,144, filed Oct. 4, 2021, and titled "SYSTEMS AND METHODS FOR CONNECTING USER ACCOUNTS." The entireties of all of the above listed applications are each hereby incorporated by this reference in each respective entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 4-32 show various instances, portions, and/or sequences of one or more graphical user interfaces relating to a metadata publication and/or a program user account, as further discussed below.

Figure 1:
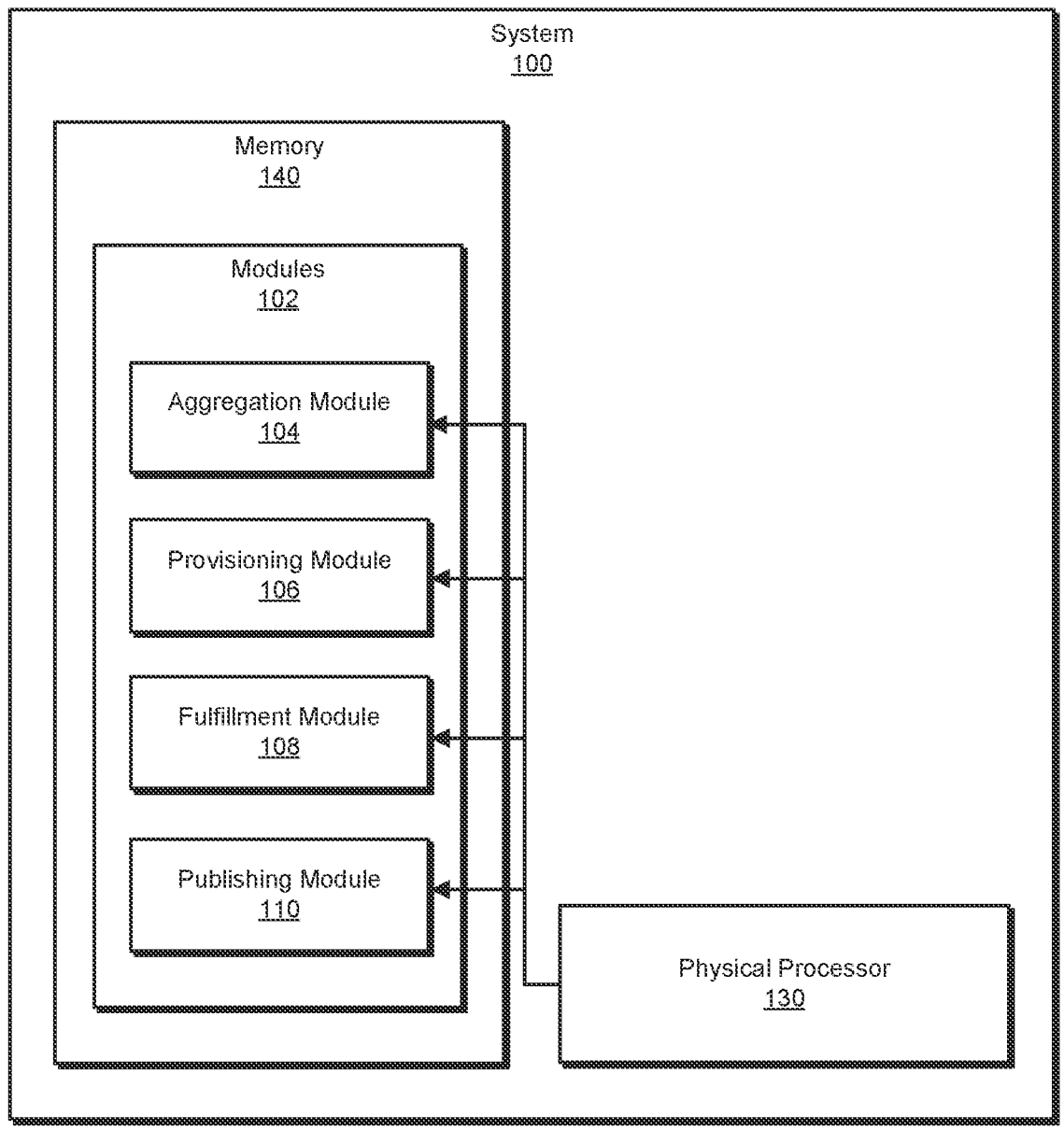
FIG. 1 is a block diagram of an example system for connecting user accounts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Modern group network applications may connect user accounts to achieve a variety of new and beneficial purposes. For example, certain popular group network applications may provide general-purpose group networking to connect users, friends, relatives, and/or families, etc. Similarly, more niche group network applications may provide targeted group networking services to connect a specific and more narrowly defined set of user accounts within a particular context.

One particular context that may benefit from new and inventive applications of group networking technology may include resource provisioning. Within this context, one set of user accounts (e.g., "program user accounts") may seek to achieve a goal, task, or solution, and another set of user accounts (e.g., "resource user accounts") may provision a set of resources to achieve that specific goal, task, or solution. One illustrative example of such resource provisioning may correspond to the non-profit organization context. In this particular example, program user accounts may seek resources from an individual, another user account, a government agency, and/or a charitable foundation, for example. Nevertheless, resource provisioning and the technology of this application potentially apply broadly within many other contexts that are not legally established as non-profit organizations. For example, the set of program user accounts may be grouped together within a group network application without a formal legal structure, much less a formal non-profit organization structure.

As a lexicographer, applicant hereby establishes the following definitions for terms. As used herein, the term "group" generally refers to a "social" group or network, unless another meaning is indicated. As used herein, the term "program" generally refers to an initiative or project, unless another meaning is indicated (e.g., a software program). As used herein, the term "metadata" generally refers to a story or narrative that describes a program, unless another meaning is indicated. As used herein, the term "non-quantitative" data generally refers to qualitative data. As used herein, the term "rich network data" generally refers to multimedia or rich network data that may be transferred over a network. The terms "instruct" or "instruction" generally refer to input unless indicated otherwise. As used herein, the term "structure" generally refers to a template unless indicated otherwise. As used herein, the term "reference" may refer to a quotation (as in the context of FIG. 15) unless indicated otherwise.

FIG. 1 shows an example system 100 that may facilitate the connecting of user accounts in accordance with FIGS. 3-32. System 100 may include a memory 140 and a physical processor 130, for example. As further shown in this figure, system 100 may include modules 102, which may further include an aggregation module 104, a provisioning module 106, a fulfillment module 108, and a publishing module 110. Aggregation module 104 may aggregate program user accounts (e.g., organizations seeking to achieve one or more particular goals, such as a non-profit or charitable goal) with resource user accounts (e.g., organizations seeking to provide resources or funding to program user accounts). Further detailed descriptions of program user accounts and resource user accounts are provided in the applications listed above and incorporated herein by reference. Provisioning module 106 may provide an interface, such as a graphical user interface, that enables the program user account or other user account to at least partially fulfill a structure for a metadata publication or descriptive publication. Illustrative examples of such an interface are shown in FIGS. 4-32, by way of example. Illustrative examples of a process for creating one or more metadata publications are shown in FIGS. 5-24, for example. Further detailed descriptions of metadata publications are provided in the applications listed above and incorporated herein by reference. Fulfillment module 108 may at least partially fulfill the structure for the metadata publication in accordance with one more instructions from a program user account or other user account, consistent with the description of FIGS. 5-24, for example. Publishing module 110 may publish one or more metadata publications, consistent with the description of FIG. 4, for example.

Figure 2:
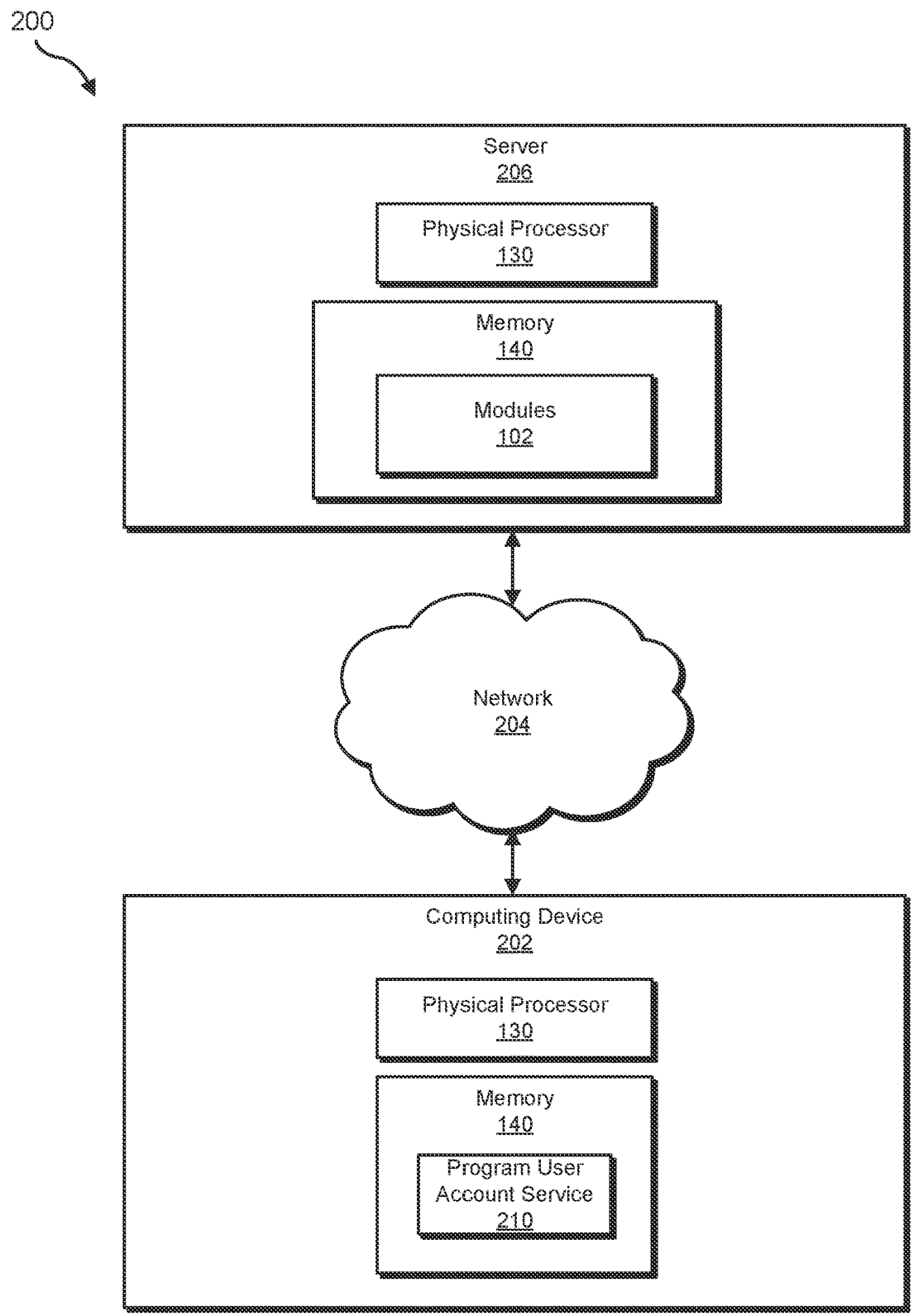
FIG. 2 is a block diagram of an additional example system for connecting user accounts.

FIG. 2 shows another example system 200 that shows a larger context in which system 100 may be disposed. As further shown in this figure, a server 206 (e.g., a backend server, web server, or app server for an organization such as Resilia) may include modules 102, which may execute method 300, as discussed in greater detail below in connection with FIG. 3. Server 206 may connect across a network 204, such as a wide area network such as the Internet, via a network 204, with the computing device 202 corresponding to one or more user accounts, such as a program user account. Computing device 202 may include a program user account service 210, which may enable one or more program user accounts to enter one or more instructions consistent with the execution of method 300, as discussed further in more detail below.

Figure 3:
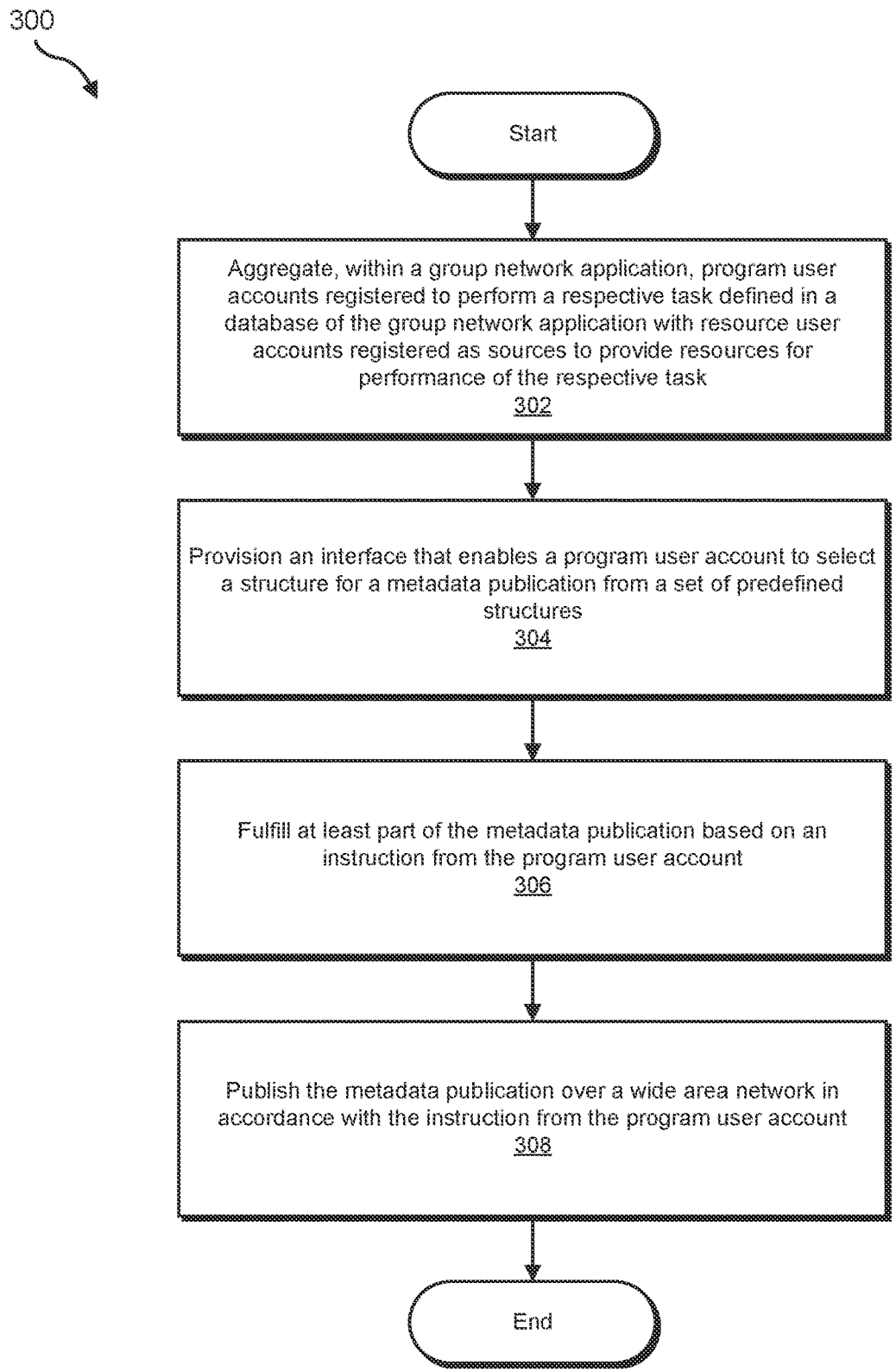
FIG. 3 is a flow diagram of an example method for connecting user accounts.

FIG. 3 shows an illustrative flow diagram for a method 300, which may be computer implemented. For example, at step 302, aggregation module 104 may aggregate, within a group network application, program user accounts registered to perform a respective task defined in a database of the group network application with resource user accounts registered as sources to provide resources for performance of the respective task. At step 304, provisioning module 106 may provision an interface that enables a program user account to select a structure for a metadata publication from a set of predefined structures. At step 306, fulfillment module 108 may fulfill at least part of the metadata publication based on an instruction from the program user account. And at step 308, publishing module 110 may publish the metadata publication over a wide area network in accordance with the instruction from the program user account.

Figure 4:
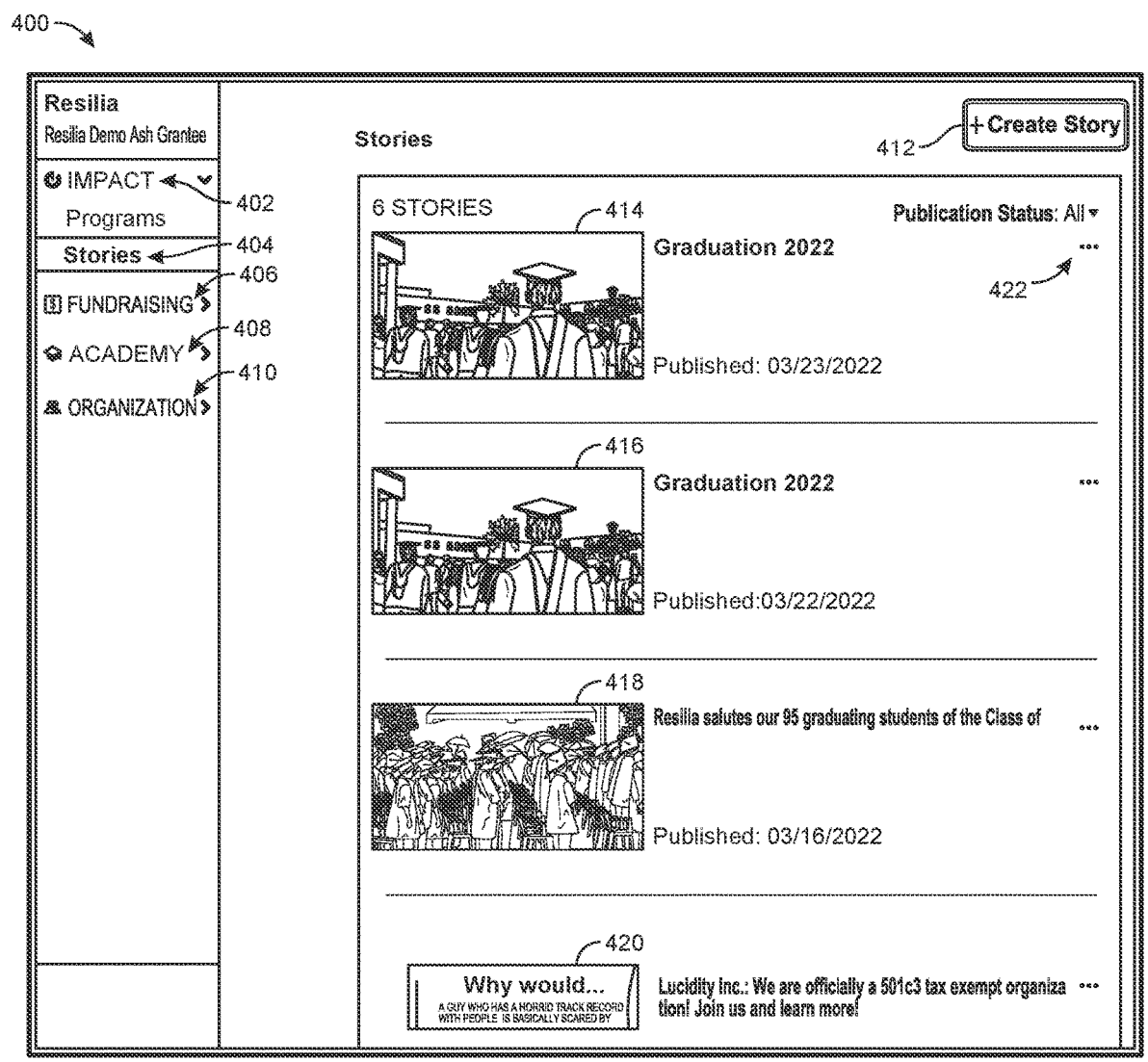

As shown in FIG. 4, and consistent with the description of metadata publications in the applications listed above and incorporated by reference, a user account such as a program user account of a group network application (e.g., the Resilia platform) may view an interface, such as graphical user interface 400, which may enable the user account to interact with, manage, edit, publish, remove from publication, and/or view a set of stories, narratives, impact narratives, descriptive publications, and/or metadata publications. In this particular example, graphical user interface 400 may include an impact link 402, a stories link 404, a fund-raising link 406, an academy link 408, and an organization link 410. Similarly, the graphical user interface may display a list of stories, and each of the stories may include a corresponding headline image, such as a headline image 414, a headline image 416, a headline image 418, and a headline image 420. Graphical user interface 400 may also provide a user interface element or button 412, which may enable the user account to create an additional story.

Figure 5:
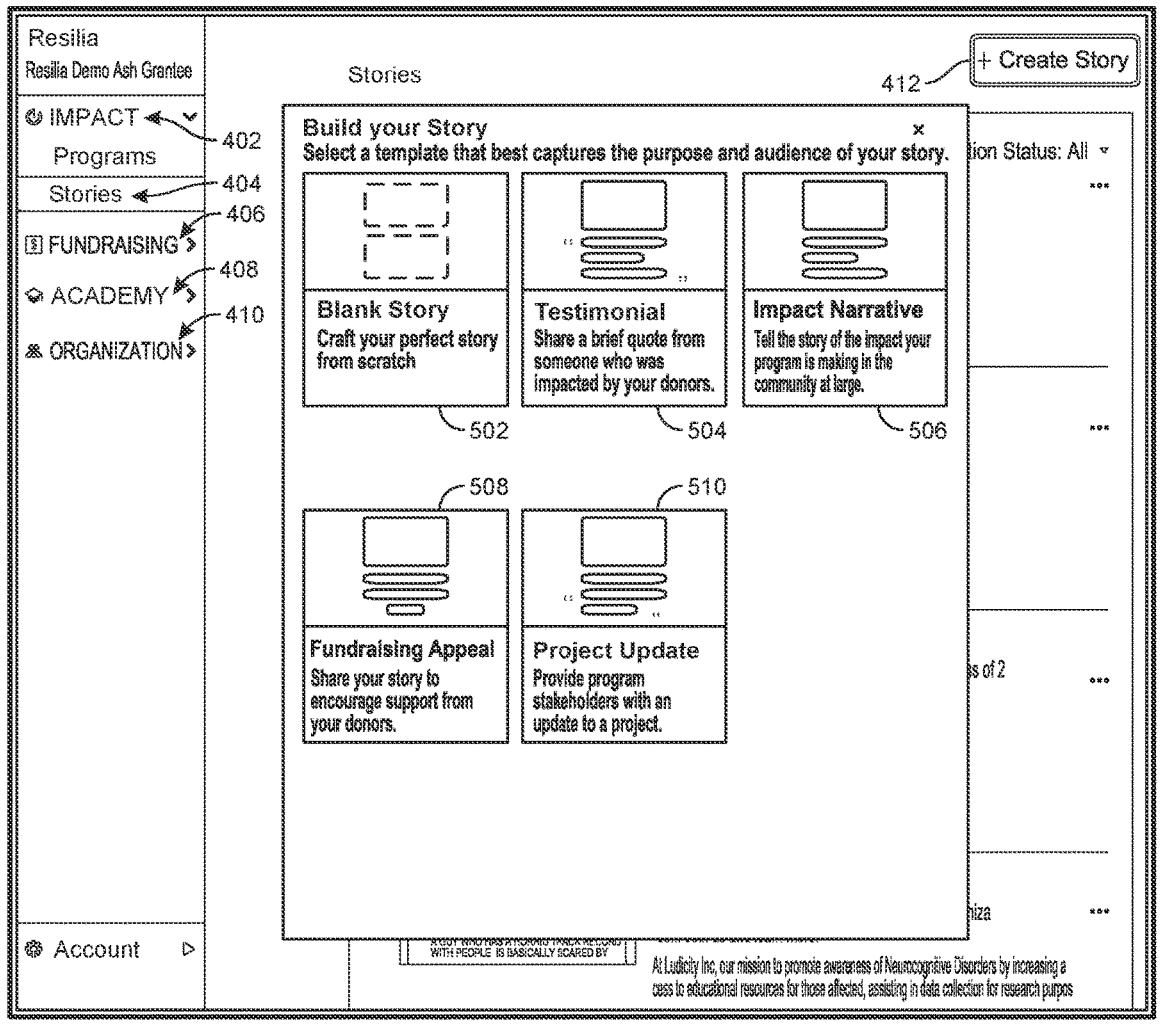

FIG. 5 shows an illustrative example of a graphical user interface 500, which may correspond to a subsequent sequence step displayed in response to the program user account selecting user interface element 412. As further shown in this figure, selection of user interface element 412 may trigger the display of a set of additional user interface elements or buttons 502-510, which may correspond to a respective structure or template that may form the basis for generating or potentially publishing a metadata publication, as further discussed below. In the example of this figure, the various structures and templates for user interface elements 502-510 may correspond to a blank story, a testimonial, an impact narrative, a fund-raising appeal, and/or project update, for example.

In other words, each template in FIG. 5 (e.g., blank story, testimonial, etc.) may correspond to a structure (e.g., a structure for a metadata publication). And each structure in the set of structures may be an order of instances of metadata publication elements selected from a set of metadata publication element data structures. As discussed further below (see FIG. 6) these metadata publication element data structures may include data structures for a title, a quotation, an item of text, an image, a video, and a call to action, as well as a header, etc. Thus, a template or structure may specify in order, arrangement, placement, structuring, or configuration for a plurality of more different instances of the title, quotation, item of text, video, call to action, etc. As one illustrative example, a particular template may specify that a title is placed at the top of the metadata publication, and formatted with centering formatting to be placed at the center of the metadata publication along a horizontal axis. Similarly, a structure or template may specify that an instance of a quotation is placed underneath the title. Moreover, as an illustrative example the structure or template may specify that multiple different instances of images and videos are placed, at a particular order or placement, further beneath the title and quotation, and so on.

Figure 6:
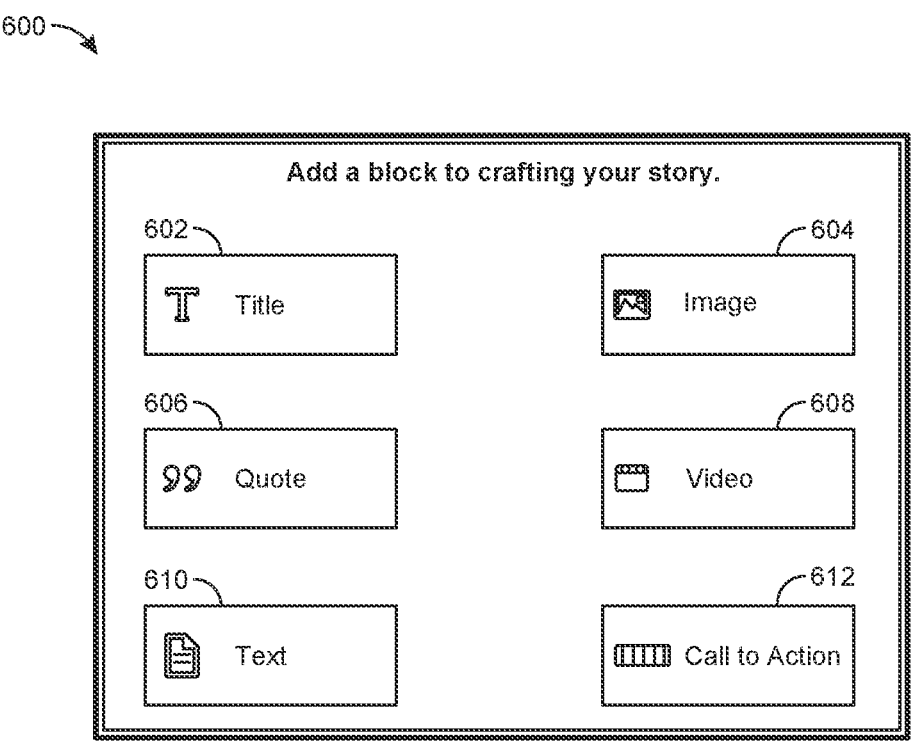

FIG. 6 shows an additional example of a graphical user interface 600, which may be displayed sequentially in response to the user selecting one or more of the user interface elements displayed in graphical user interface 500. By way of illustrative example, the program user account may select user interface element 502, which may correspond to a blank story, or a structure that provides relatively little or zero preconfigured formatting for fulfilling or completing the metadata publication. In response to selection of user interface element 502, graphical user interface 600 may display an additional set of user interface elements 602-612, which may correspond to a set of metadata publication element data structures.

As used herein, the term "metadata publication element data structures" generally refers to, consistent with FIGS. 6-24, a data structure that may enable a user account, such as a program user account, to supplement one or more items of based or underlying information with additional structure, metadata, formatting, and/or arrangement for appropriate placement or disposition within a metadata publication as published. As one illustrative example, the metadata publication element data structure for a quotation or reference, corresponding to user interface element 606, requests three text strings for the literal quote itself, the author of the quote, and a role of the author of the quote (see FIG. 16). Based on these three minimal instances of textual information, the corresponding metadata publication element data structure may provide formatting, arrangement, stylization, embellishment, and/or structuring, which may result in the stylized display of a quotation (see FIG. 17). As further shown in FIG. 17, usage of the metadata publication element data structure may provide stylized horizontal lines, a quotation mark, and ordering or arrangement of the three items of textual information, and bolding of one of the items of actual information (e.g., bolding of the author name). The other examples of metadata publication element data structures (e.g., data structures for one or more of a title, image, video, text, or call to action, which may also be referred to as a program user account request) may function in a substantially similar or parallel manner by accepting or inputting one or more items of based or underlying information and then providing embellishing, formatting, supplementation, placement, or arrangement, etc., consistent with FIGS. 6-24. Moreover, by analogy, structures or templates may also provide additional structuring, embellishing, formatting, supplementation, and/or arranging onto one or more metadata publication element data structures, and a manner that is parallel to how the metadata publication element data structures further provide such structuring or configuration for underlying items or fields of information, as further discussed above. By way of illustrative example, a particular template may accept one or more data structures for a title, quotation, item of text, image, video, and/or call to action, and as output provide further structuring, stylization, arrangement, placement, and/or configuration, etc., thereby producing a more finalized metadata publication that is more suitable for publishing over a wide area network.

Figure 7:
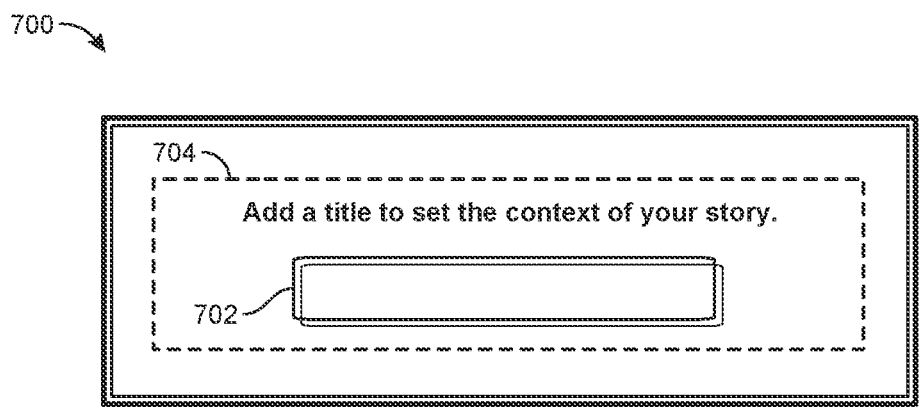

FIG. 7 shows another illustrative example of a graphical user interface 700, which may include a sub-image 704, and a sub-image 702. Graphical user interface 700 may be displayed in response to a user account, such as a program user account, selecting user interface element 602 within graphical user interface 600 in order to properly configure and display a title for metadata publication, as further discussed below. Graphical user interface 700 may further include an image, which may include sub-image 702 and sub-image 704. Accordingly, when the user account such as a program user account selects any part of the image, such as sub-image 702, graphical user interface 700 may sequentially transform into a graphical user interface 800, as discussed further below in connection with FIG. 8.

Figure 8:
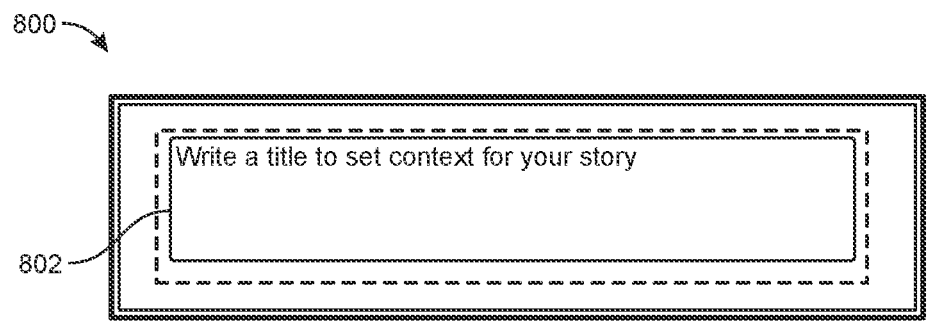

As shown in FIG. 8, graphical user interface 800 may include another user interface input element 802, which may be displayed in response to the user account selecting or toggling any part of the image of graphical user interface 700. Graphical user interface 800 may also display a prompt to the user account regarding the inputting of textual information or other information as a title for a corresponding story or narrative (e.g., "Write a title to set context for your story"). Upon entering graphical user interface 800, a cursor may be displayed within user interface input element 802, thereby enabling a user to enter a string of text, which may form the title for a corresponding metadata publication. Upon appropriate instruction from the user account, such as clicking enter or clicking outside of user interface input element 802, the title may be displayed as part of the in-progress metadata publication, in font, positioning, formatting, and/or stylization that is appropriate or indicative of a publication title (see FIG. 9).

Figure 9:
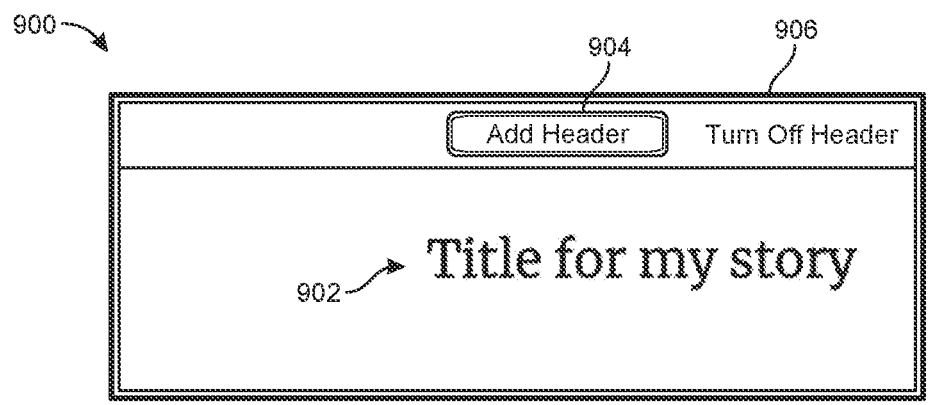

FIG. 9 shows another sequence step or transformation of the graphical user interface, in the form of a graphical user interface 900, in which the user has appropriately completed, entered, or finalized (e.g., by clicking outside of a user input space) the title. In this example, graphical user interface 900 displays a title 902, which is presented in a larger font with a heightened sense of stylization (e.g., in comparison to FIG. 8). Additionally, in response to entering or finalizing input for the title, graphical user interface 900 may also display the user interface element 904 and user interface element 906, which may be presented in the form of buttons, for example. As one illustrative example, user interface element 904 may enable a user account to add a header to a corresponding metadata publication. Similarly, user interface element 906 may enable the user account to turn off the corresponding header.

Figure 10:
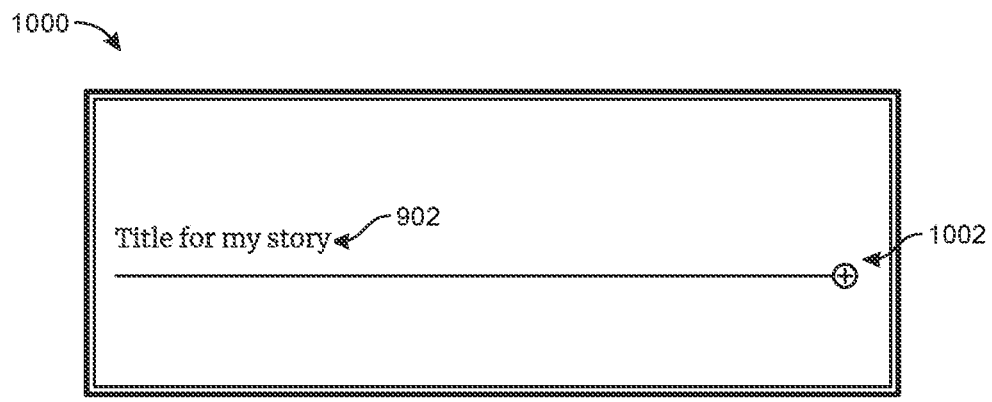

FIG. 10 shows another sequence step or transformation of the graphical user interface, in the form of a graphical user interface 1000, which may be displayed in response to a user account completing or entering a title (or other metadata publication element) in accordance with FIGS. 7-9, for example. As further shown in this figure, in response to the entering of one metadata publication element (e.g., an instance of a title, text, image, quote, video, header, or call to action), graphical user interface 1000 may further display a tool 1002, which may enable the corresponding user account to insert or add another metadata publication element (e.g., another instance of the same or different one of a title, text, image, quote, video, header, or call to action, etc.). In the form of FIG. 10, tool 1002 may be presented as a stylized horizontal line that further includes, at an endpoint, a circular icon surrounding an addition sign. The addition sign may further indicate to the user account that, upon toggling or selecting of the addition sign (or any part of a remainder of tool 1002), the user account may thereby be presented with an additional sub-interface, as part of the tool, which may further enable the user account to add one or more additional instances of the metadata publication elements, such as those that are further listed above.

Figure 11:
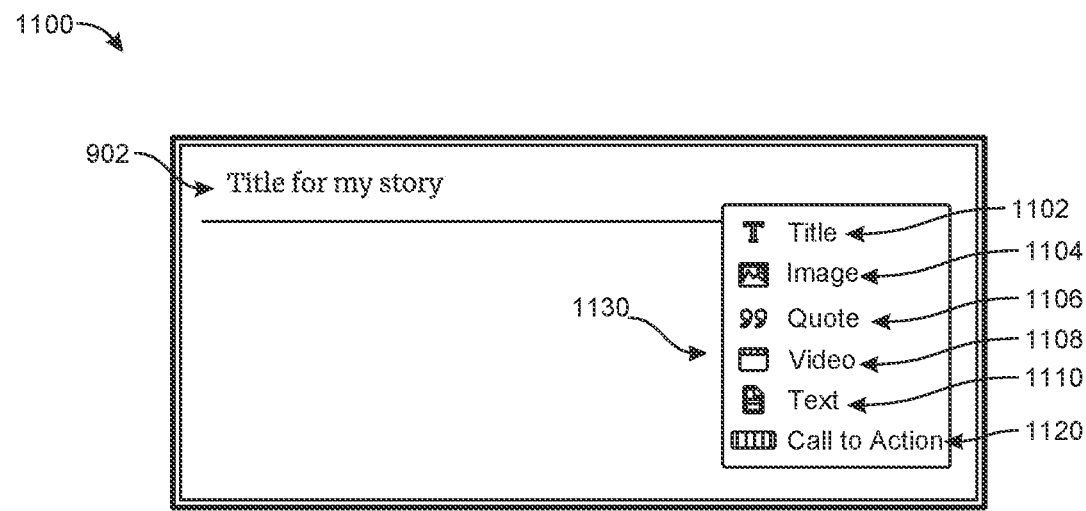

FIG. 11 shows another sequence step or transformation of the graphical user interface, in the form of a graphical user interface 1100, and in particular a menu 1130, which may be displayed in response to the user account selecting or toggling tool 1002 and/or the corresponding addition sign, as discussed above in connection with FIG. 10. Menu 1130 may be analogous to graphical user interface 600, and the set of both of these enable the corresponding user account to select one or more types of metadata publication elements and/or corresponding data structures, to thereby insert an instance of such a metadata publication element into the corresponding metadata publication. In the example of FIG. 6, graphical user interface 600 enables a user account to insert such a metadata publication element from scratch into what constitutes an effectively blank document, whereas menu 1130, in combination with tool 1002, may enable the user account to do so within a specific position within an in-progress metadata publication, depending on where the specific position is the user account selects or toggles a part of tool 1002. As further shown in FIG. 11, graphical user interface 1100 may display respective series of words and/or a respective series of corresponding icons 1102-1120, from which the user account may select a title data structure, and image data structure, a quote data structure, a video data structure, a text data structure, and/or call to action (i.e., a program user account request) data structure.

Figure 12:
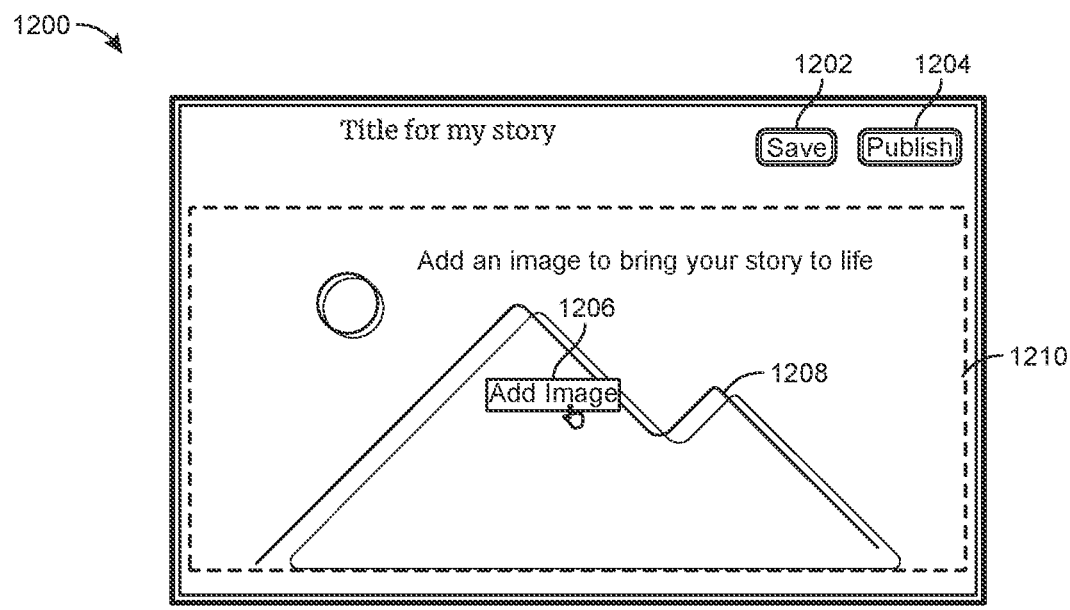

FIG. 12 shows an illustrative example of another sequence step or transformation of the graphical user interface, in the form of a graphical user interface 1200, which may be displayed in response to the user account having selected or toggled a corresponding icon for the image data structure, as further discussed above in the context of FIG. 11. As further shown in this figure, the graphical user interface 1200 has inserted a user interface element 1210, corresponding to the insertion of an image, within the overall context of the larger graphical user interface. Moreover, user interface element 1210 has been inserted beneath the title that was previously inserted into the metadata publication, which is consistent with the horizontal bar of tool 1002 being placed beneath title 902 (see FIG. 9). In other words, tool 1002 may have a structure, stylization, or graphical orientation that further indicates where an additional metadata publication element will be inserted within a corresponding in-progress metadata publication. Thus, if the horizontal bar or other graphical indication designates that the metadata publication element will be inserted at a particular spot, or beneath or above a previously placed metadata publication element, then insertion of a new metadata publication element (e.g., title, text, image, video, header, quote, call to action, etc.) will be placed at that particular spot in accordance with the graphical indication.

In the example of FIG. 12, graphical user interface 1200 displays user interface element 1210, which further includes a graphic 1208 and a user interface instruction element 1206, which enables a user account to enter a sub-interface for browsing and/or selecting a corresponding image into a position or area of the metadata publication that corresponds to user interface element 1210. Graphical user interface 1200 may also include a user interface element 1202 and a user interface element 1204, which may further enable the user account to save or publish the corresponding metadata publication, as further discussed above.

Figure 13:
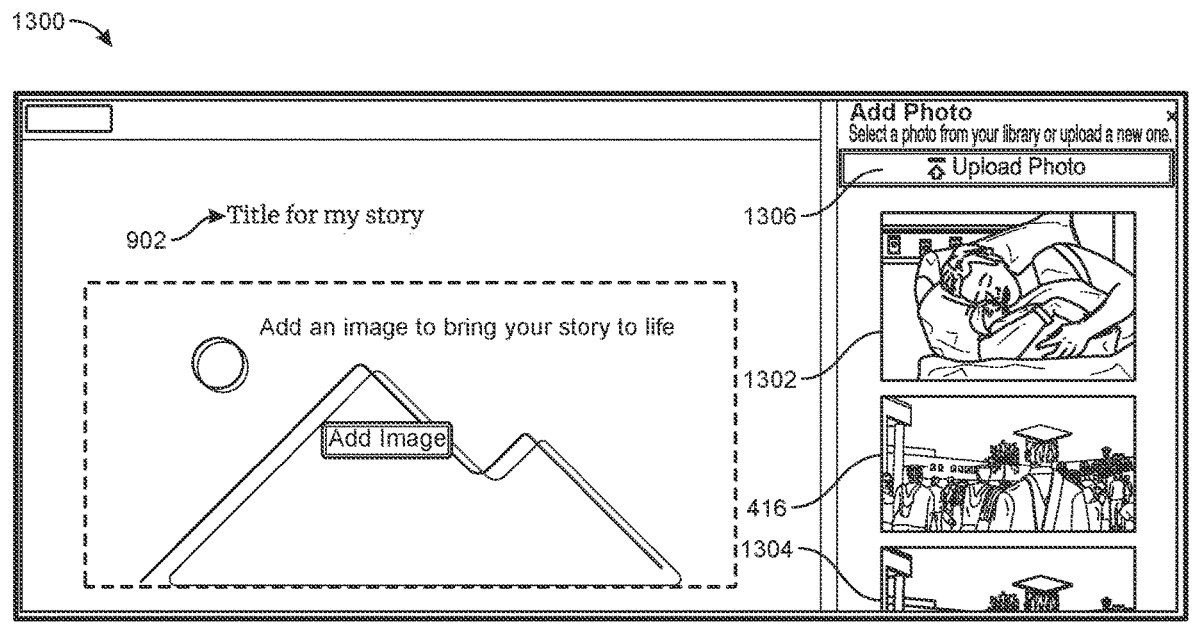

FIG. 13 shows another illustrative example of a sequence or transformation of the graphical user interface, in the form of a graphical user interface 1300, which may be displayed in response to the user account selecting or toggling user interface element 1204. As further illustrated in this figure, graphical user interface 1300 may further display a list, sequence, or gallery of preexisting or previously saved images and/or icons, which may be included within a pre-existing library of such images, including an icon 1302, an icon or headline image 416 (see FIG. 4), and an icon 1304, etc. Graphical user interface 1300 may also include a user interface element 1306, such as a button, which may enable the user account to upload (e.g., to the cloud and/or to a server for a group network application such as Resilia) one or more images, which may correspond to one or more of the icons, and which may have been previously stored within the library of a local computing device of the user account, for example.

Figure 14:
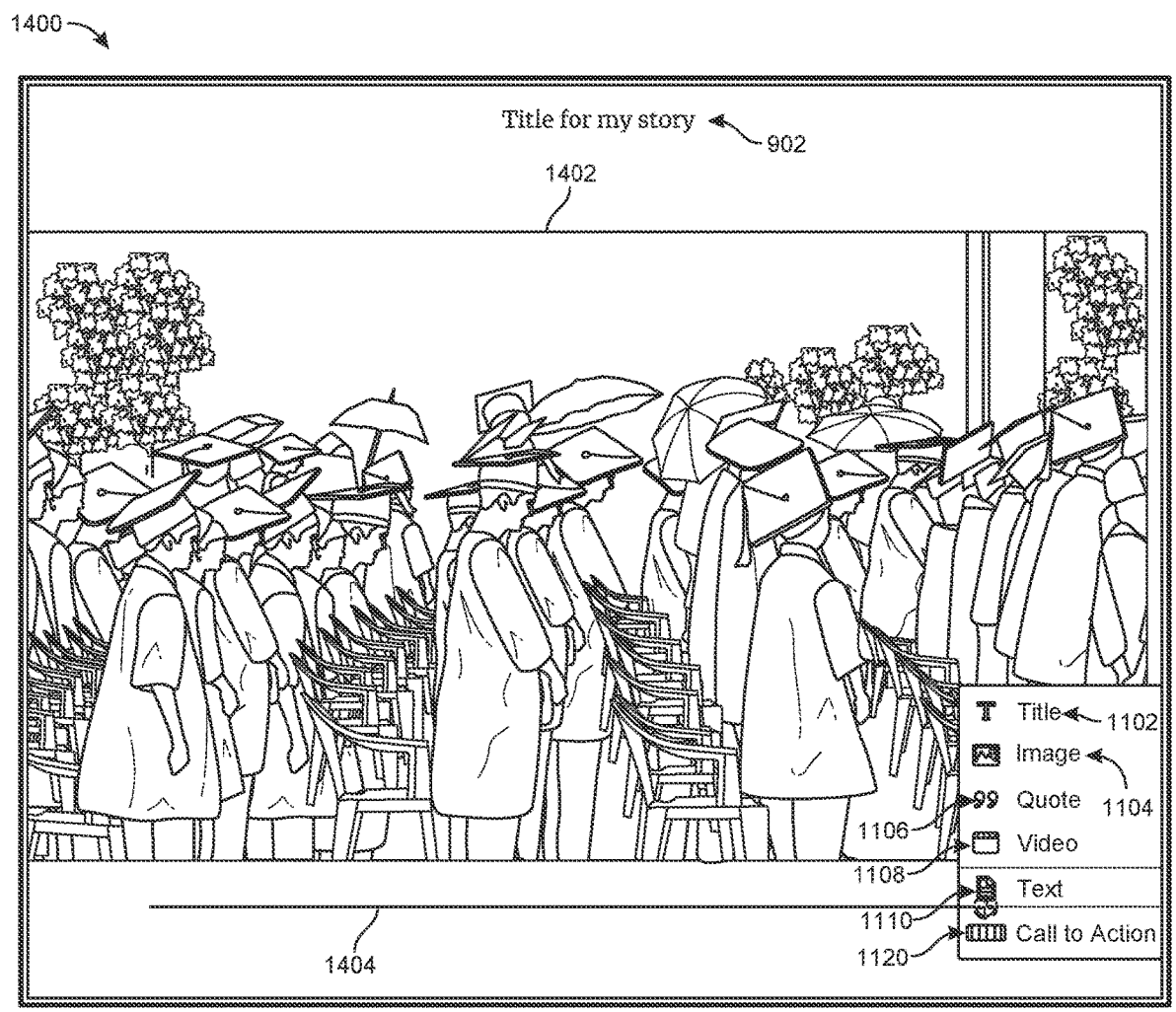

FIG. 14 shows another illustrative example of a sequence or transformation of the graphical user interface, in the form of a graphical user interface 1400, after the selection, completion, and/or finalization of inserting (see FIG. 13) an image 1402, which has been inserted beneath the title 902 is shown. As further shown in this figure, insertion of image 1402 has further triggered the display of another instance 1404 of tool 1002, including the corresponding horizontal bar. As discussed above in connection with FIGS. 10-12, for example, the user account may select or toggle a portion of tool 1002 (e.g., the circle surrounding the addition sign), which may further trigger the display of a menu that further displays icons 1102-1120, as further discussed above in the context of FIG. 11.

Figure 15:
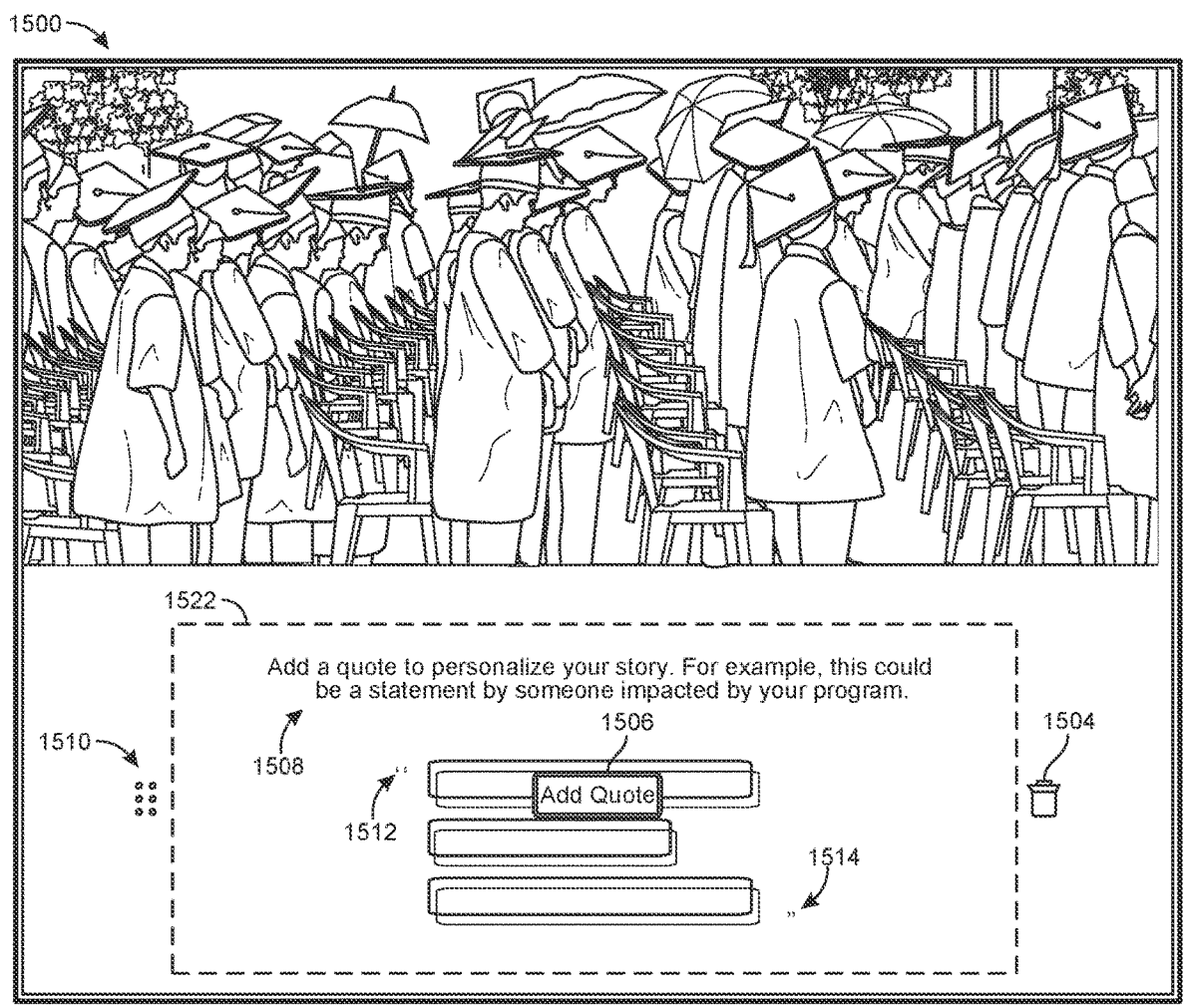

FIG. 15 shows another illustrative example of a sequence or transformation of the graphical user interface, in the form of a graphical user interface 1500, after the user account has selected icon 1106 (see FIG. 14), which corresponds to a reference or quotation data structure. As further shown in this figure, selection of icon 1106 may trigger display of user interface element 1522, which may include a prompt 1508, which may prompt the user account to add a corresponding reference or quotation. In particular, the prompt may specify "[a]dd a quote to personalize your story" and "[f]or example, this could be a statement by someone impacted by your program." User interface element 1522 may also further include an open quotation indicator 1512 and a close quotation indicator 1514. Moreover, user interface element 1522 may include a user interface element 1506, which may enable the user account to enter one or more fields of information to complete a data structure for the quotation after the user account selects or toggles user interface element 1506. Furthermore, this figure illustrates how graphical user interface 1500 may further include a trash icon 1504, which may enable the user to trash or discard an in-progress quotation data structure (i.e., exit from the graphical user interface procedure for insertion of the quotation data structure), and graphical user interface 1500 may further include a handlebar icon 1510, which may enable the user account to drag, drop, swap, rearrange, and/or place the metadata publication element for the quotation corresponding to user interface element 1522.

Regarding handlebar icon 1510, this type of icon may be displayed adjacent any finalized or in-progress metadata publication element (e.g., for a title, quote, text, image, video, call to action, header, etc.), thereby enabling a corresponding user account to drag-and-drop, swap, reorder, and/or otherwise rearrange one or more metadata publication elements. Thus, at a fine or granular level, the user account may adjust user interface element 1522 in order to rearrange the placement shifting to the left, to the right, or up or down, etc., in which case user interface element 1522 for the corresponding quotation may be placed above a previously placed image (e.g., image 1402) rather than being placed beneath it. Similarly, handlebar icon 1510 may enable the user account to rearrange or adjust the placement of user interface element 1522 such that the corresponding quotation is placed above title 902 rather than beneath it, etc.

Figure 16:
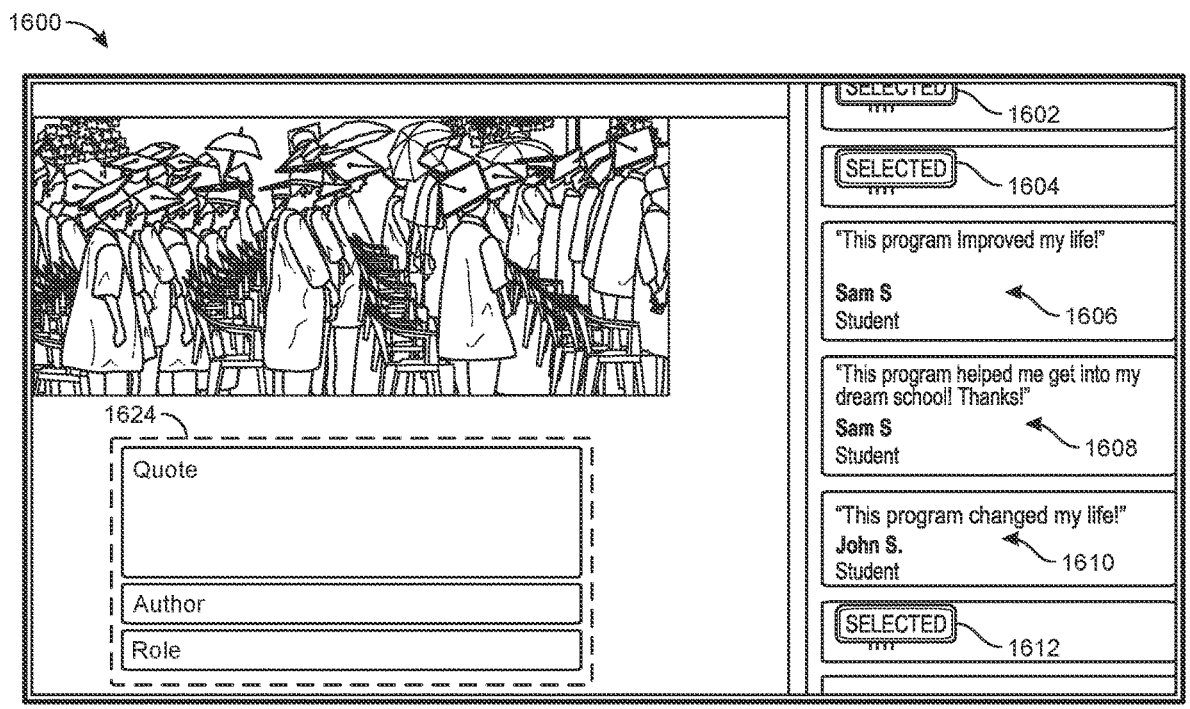

FIG. 16 shows another sequence step or transformation of the graphical user interface, in the form of a graphical user interface 1600, which may be displayed in response to the user selecting or toggling user interface element 1506. As further shown in this figure, the toggling of user interface element 1506 may further trigger the displaying of a user interface element 1624, which may further enable the user account to input text or information into multiple fields corresponding to the data structure for the quotation. In this illustrative example, the data structure for the limitation may include three separate fields, which may further specify the literal text of the quotation, the author of the quotation, and/or a role of the author of the quotation. Moreover, this figure further illustrates how graphical user interface 1600 may further display preexisting references or quotations 1602-1612, from a library of such existing references or quotations, which may enable the user account to select from the library in order to populate the fields of user interface element 1624.

Figure 17:
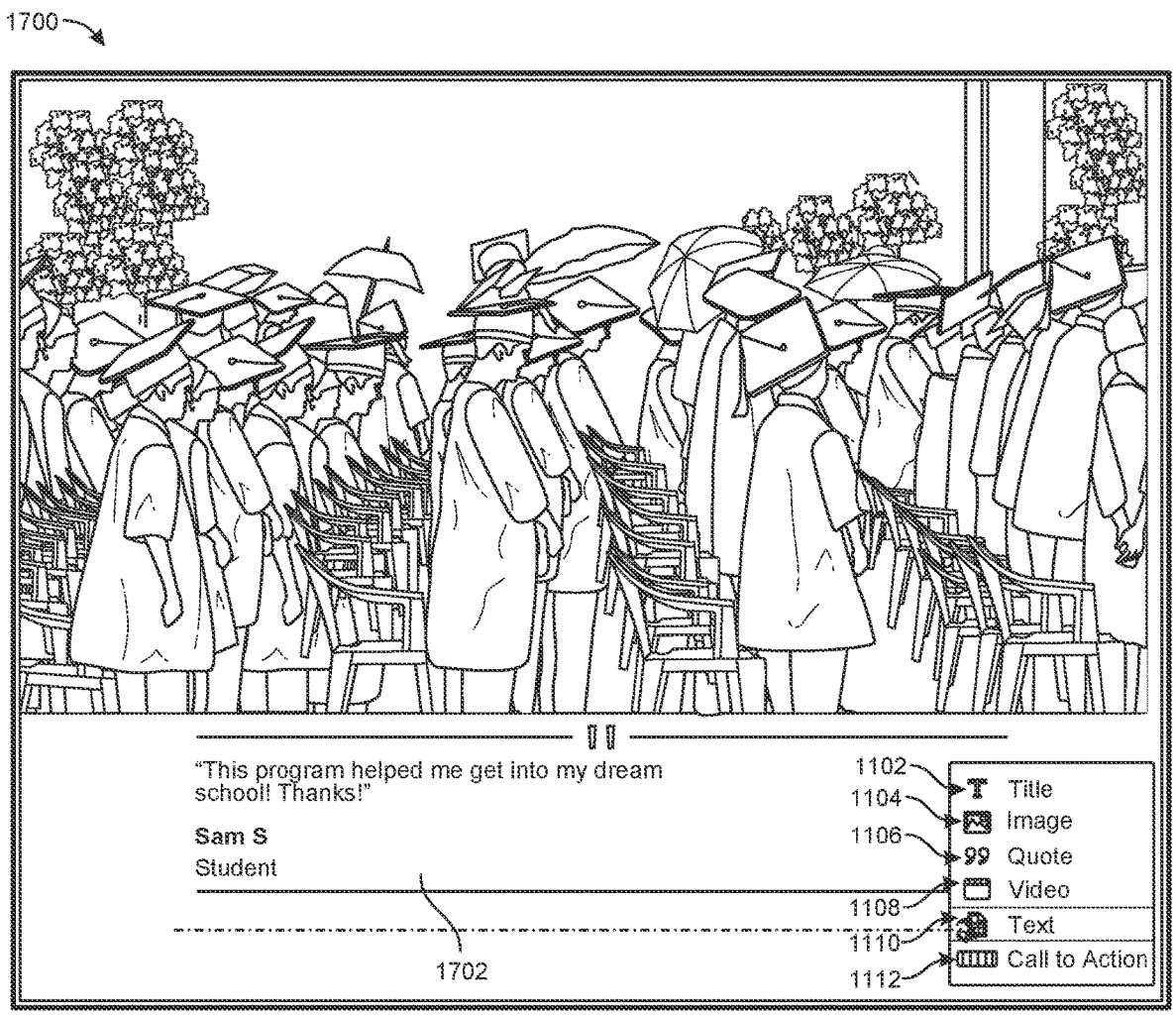

FIG. 17 shows another sequence step or transformation of the graphical user interface, in the form of a graphical user interface 1700, which may be displayed in response to the user account having completed, entered, or finalized the insertion of the corresponding quotation, as discussed above in the context of FIGS. 15-16, for example. In particular, graphical user interface 1700 may be displayed in response to the user having completed (e.g., populated the fields of user interface element 1624) by selecting quotation 1608, which specifies that "[t]his program helped me get into my dream school!" Accordingly, by selecting quotation 1608, graphical user interface 1700, in connection with system 100, may populate the fields of user interface element 1624 using the values previously stored for quotation 1608. Upon completion or finalizing of this process, the corresponding quotation may be inserted within the in-progress metadata publication, as shown in FIG. 17, whereby the quotation is displayed within a stylized format, with appropriate horizontal bars, a stylized quotation mark (e.g., in the center of the top horizontal bar), bolding, inter-line spacing, etc. Of course, the particular formatting or stylization shown in this figure is merely illustrative, and in other examples other instances of formatting or stylization may be used as appropriate.

Figure 18:
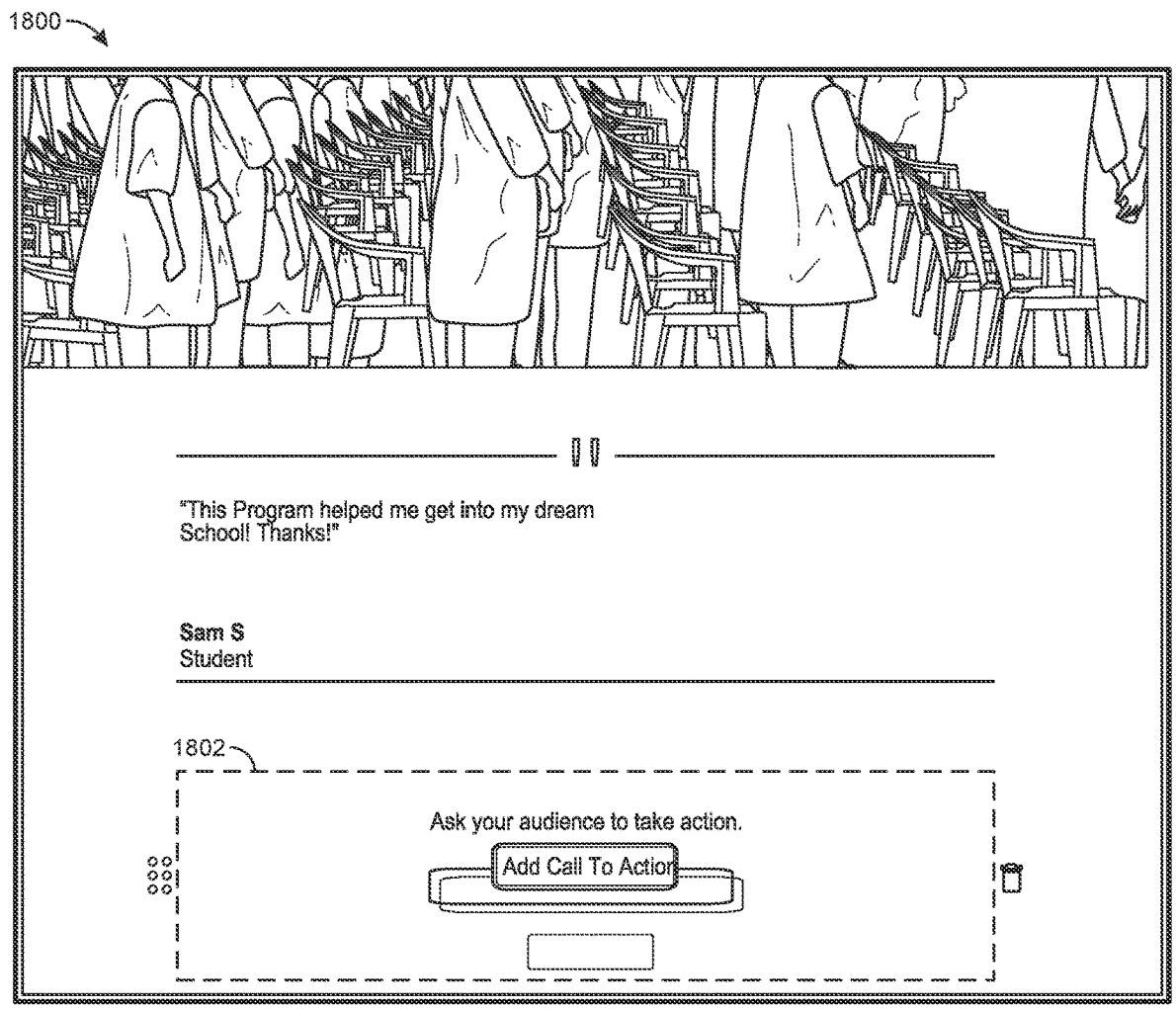

FIG. 18 shows another sequence step or transformation of the graphical user interface, in the form of a graphical user interface 1800, which may be displayed in response to the user selecting a call to action or program user account request, which may correspond to call to action icon 1112 (see FIG. 17). As further shown in this figure, the selection or toggling of call to action icon 1112 may trigger the display of a user interface element 1802. Similar to the other examples of metadata publication elements discussed above (e.g., title, image, quotation, etc.), user interface element 1802 may correspond to a uniform or flight image, and the user account may select or click within any portion of user interface element 1802 to thereby trigger a more detailed or interactive user interface element, such as a graphical user interface wizard, which may enable the user to more conveniently populate appropriate fields for data structure for the call to action.

Figure 19:
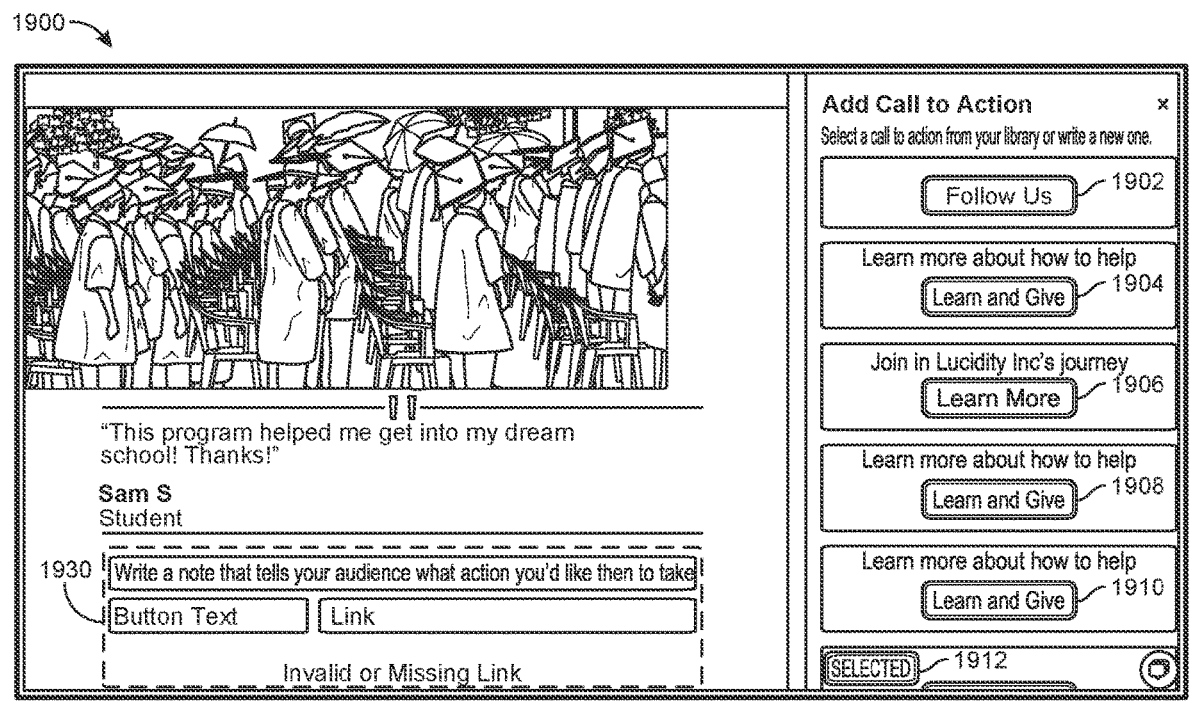

FIG. 19 shows another sequence step or transformation of the graphical user interface, in the form of a graphical user interface 1900, which may be displayed in response to the user account selecting or toggling user interface element 1802. As further shown in this figure, selection or toggling of user interface element 1802 has thereby inserted a user interface element 1930. Moreover, as discussed above in the context of tool 1002, user interface element 1930 has been placed or inserted beneath the metadata publication element for the quotation, which is further discussed above in the context of FIGS. 15-17, for example. By analogy to the previous discussions of metadata publication elements, selection or toggling of user interface element 1802 may thereby further trigger the displaying of user interface element 1930, which enables the user account to enter a text or items of information to populate the fields of the corresponding data structure for the call to action. Moreover, the user account may also select from a library of preexisting call to action data structures, which may correspond to user interface elements 1902-1912, for example. As used herein, the term "call to action" or "program user account request" may generally refer to an interactive element or portion of a corresponding metadata publication that provides a sub-interface for another user account, such as a resource user account, to thereby provide funds or resources to help a specific program user account to achieve a respective task, as further discussed above. In the illustrated example of this figure, user interface element 1930 enables the user account to populate fields for (i) a note that describes to the audience or resource user accounts which specific actions or tasks are being targeted, (ii) text for a button or user interface element that when toggled or selected, initiates a process for the corresponding user account to provide funds or resources, and/or (iii) text for a link to a website or other location that provides more information regarding a particular program or initiative associated with the specific actions or tasks that request or need additional resources. These three fields of metadata for populating a corresponding data structure for the call to action are merely illustrative and, in other examples, additional or different sets of fields may be used as appropriate.

Figure 20:
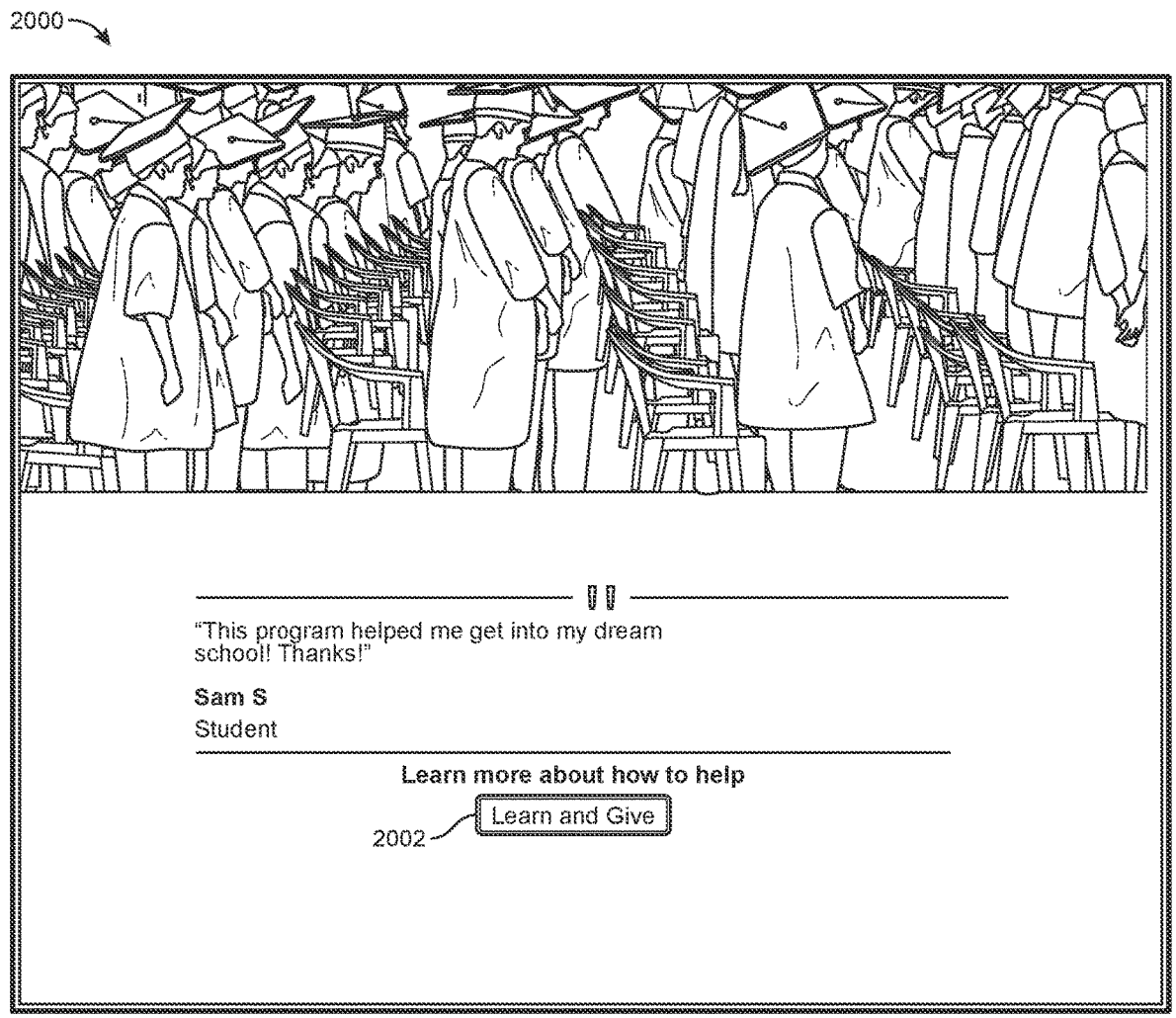

FIG. 20 shows another illustrative example of a sequence step or transformation of the graphical user interface, in the form of a graphical user interface 2000, which may be displayed after the user has entered, completed, or finalized a process of inserting a metadata publication element corresponding to the call to action discussed above (see FIG. 19). As further shown in this figure, the metadata publication element responding to the call to action, including a corresponding user interface element or button 2002, has been inserted into the in-progress metadata publication. Moreover, the metadata publication element including button 2002 has been inserted beneath the previously discussed quotation (see FIG. 17), which is consistent with the description and placement of tool 1002, as further discussed above. Thus, when a user account such as a resource user account selects or toggles user interface element 2002, this may further trigger navigation by the user account to another interface, sequence step, and/or website, etc., whereby the user account may initiate or begin a process for providing funds or other resources to a corresponding program user account (e.g., to help a particular program or initiative that helps a student to "get into my dream school" as shown in FIG. 20).

Figure 21:
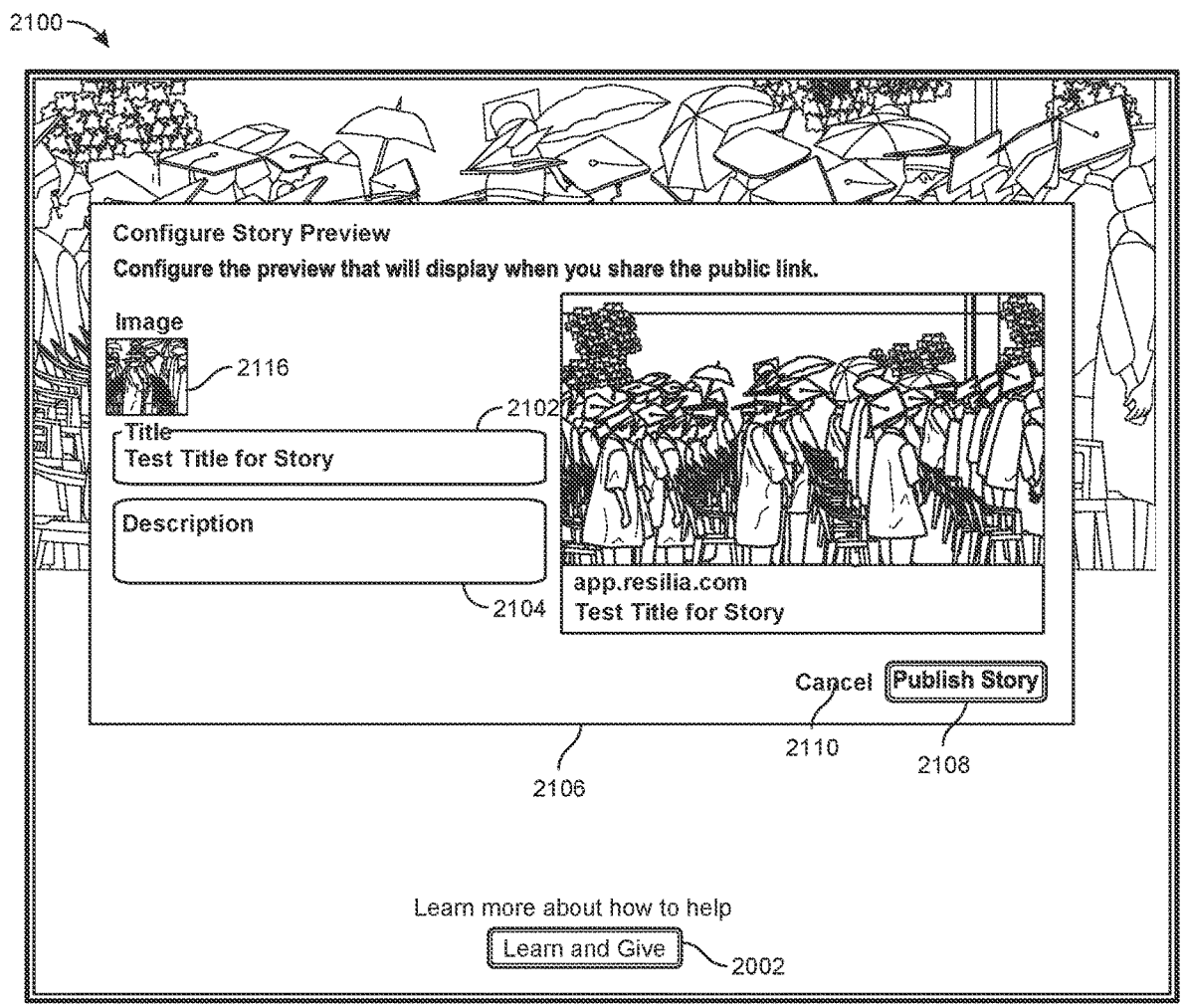

FIG. 21 shows another illustrative example of a sequence step or transformation of the graphical user interface, in the form of a graphical user interface 2100, which may be displayed in response to the user account at least partially completing or finalizing a metadata publication for publishing. Thus, in response to the user account selecting an appropriate user interface element, such as a user interface element or button corresponding to generation of a preview, graphical user interface 2100 may be displayed in response. As further shown in this figure, graphical user interface 2100 may generally correspond to a sub-interface or wizard 2106 that enables the user account to configure a preview for the metadata publication. Wizard 2106 may further include an image 2116, a user interface element 2102 for entering, configuring, or previewing a title, and a user interface 2104 for entering, configuring, or previewing an appropriate description. As further shown in this figure, graphical user interface 2100 may further include the previously designated image, a link to an appropriate website (e.g., "app.resilia.com"), and the title, which may further correspond to user interface element 2102, as discussed above. Additionally, wizard 2106 may also include a user interface element 2110 and a user interface element 2108 for performing a cancellation operation and/or a publishing operation, respectively, and as further illustrated in FIG. 21.

Figure 22:
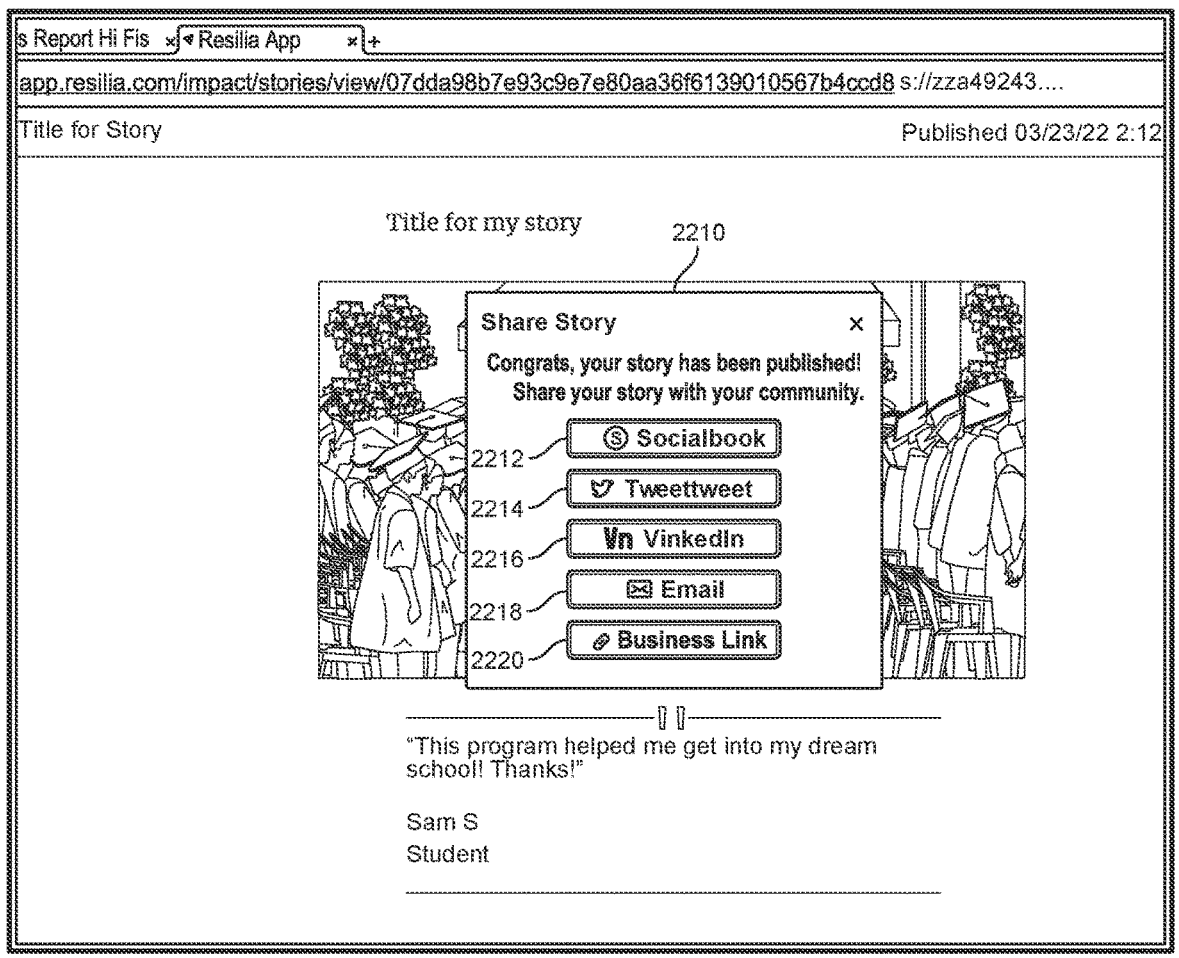

FIG. 22 shows another illustrative example of a sequence step or transformation of the graphical user interface, in the form of a graphical user interface 2200, which may be displayed in response to the user account selecting or toggling user interface element 2108 for publishing the corresponding metadata publication. As further shown in this figure, graphical user interface 2200 may further include a sub-interface 2210, which may display an appropriate notification to the user account ("[c]ongrats, your story has been published!") As well as an additional prompt to notify the user account that the user account may share the story or corresponding metadata publication through inter-application sharing functionality using user interface elements 2212-2220, which may correspond to respective applications (e.g., group network applications or email applications), through which the metadata publication and/or its corresponding public address or uniform resource locator may be shared outside of the original group network application (e.g., the Resilia platform).

Figure 23:
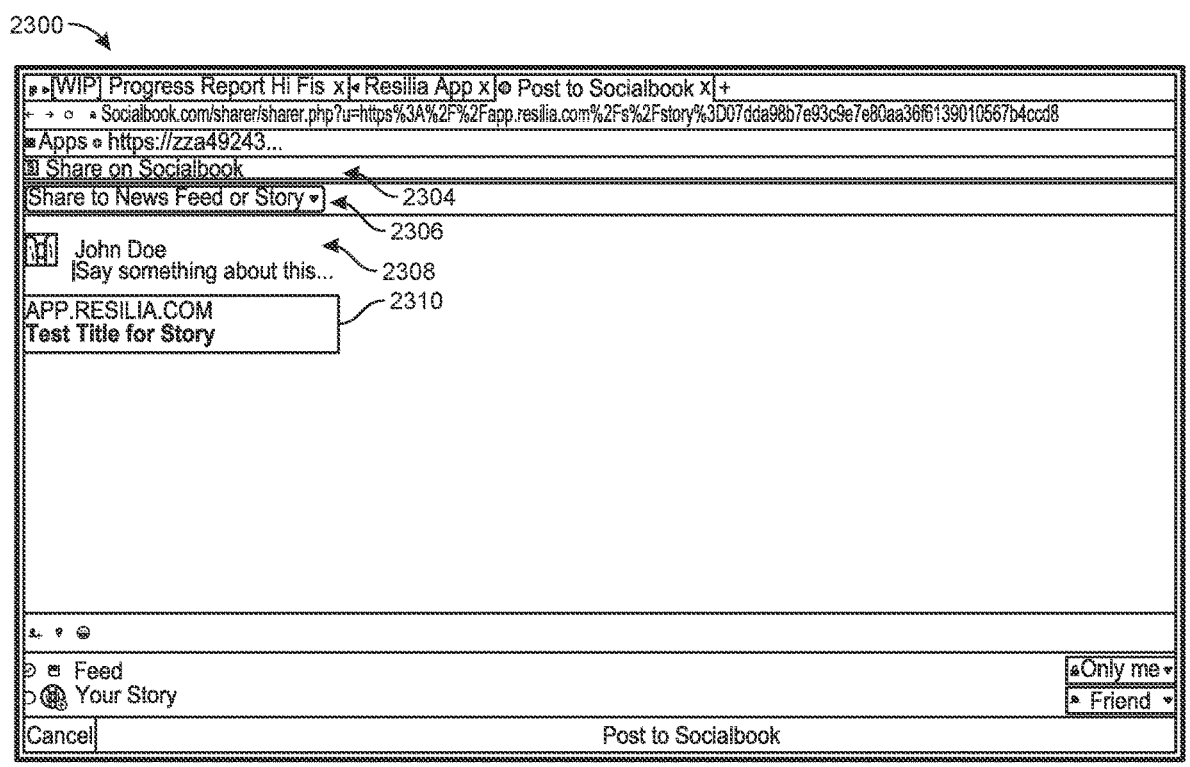

FIG. 23 shows a graphical user interface 2300 that may enable the user account or corresponding user to share the metadata publication within another platform (e.g., SOCIALBOOK), which may be outside of the original group network application platform (e.g., RESILIA). As further shown in this figure, graphical user interface 2300 may include an icon or indicator 2304, which may specify to the corresponding user account or user that the user is within the additional platform and preparing to share the metadata publication on that specific platform (e.g., SOCIALBOOK). Graphical user interface 2300 may also include another user interface element 2306, which may include a drop-down menu, which may enable the user account or user to select with which ones of multiple different portions of the external platform the user wishes to share the metadata publication. In the particular example of this figure, the metadata publication may be shared with a "news feed" or "story" portion of the external platform. Similarly, a user interface element 2308 may specify the name of the user or user account (e.g., "John Doe") and may furthermore include a prompt that prompts the user to provide a brief description or explanation regarding the metadata publication. In this particular example, the prompt may specify "[s]ay something about this . . . " Lastly, graphical user interface 2300 may further include a user interface element 2310, which may further designate to the user that the metadata publication originated from the original platform (e.g., Resilia), and may further specify the title was previously selected or configured for this particular metadata publication (see FIGS. 7-10). Moreover, the user interface element 2310 may further correspond to an external link (e.g., a link to the metadata publication on the Resilia platform at a web address such as "app.resilia.com"), such that the user at the external platform may select or toggle user interface element 2310 and thereby be redirected or navigated back to the original platform that is hosting the metadata publication (e.g., hosting at its original source).

Figure 24:
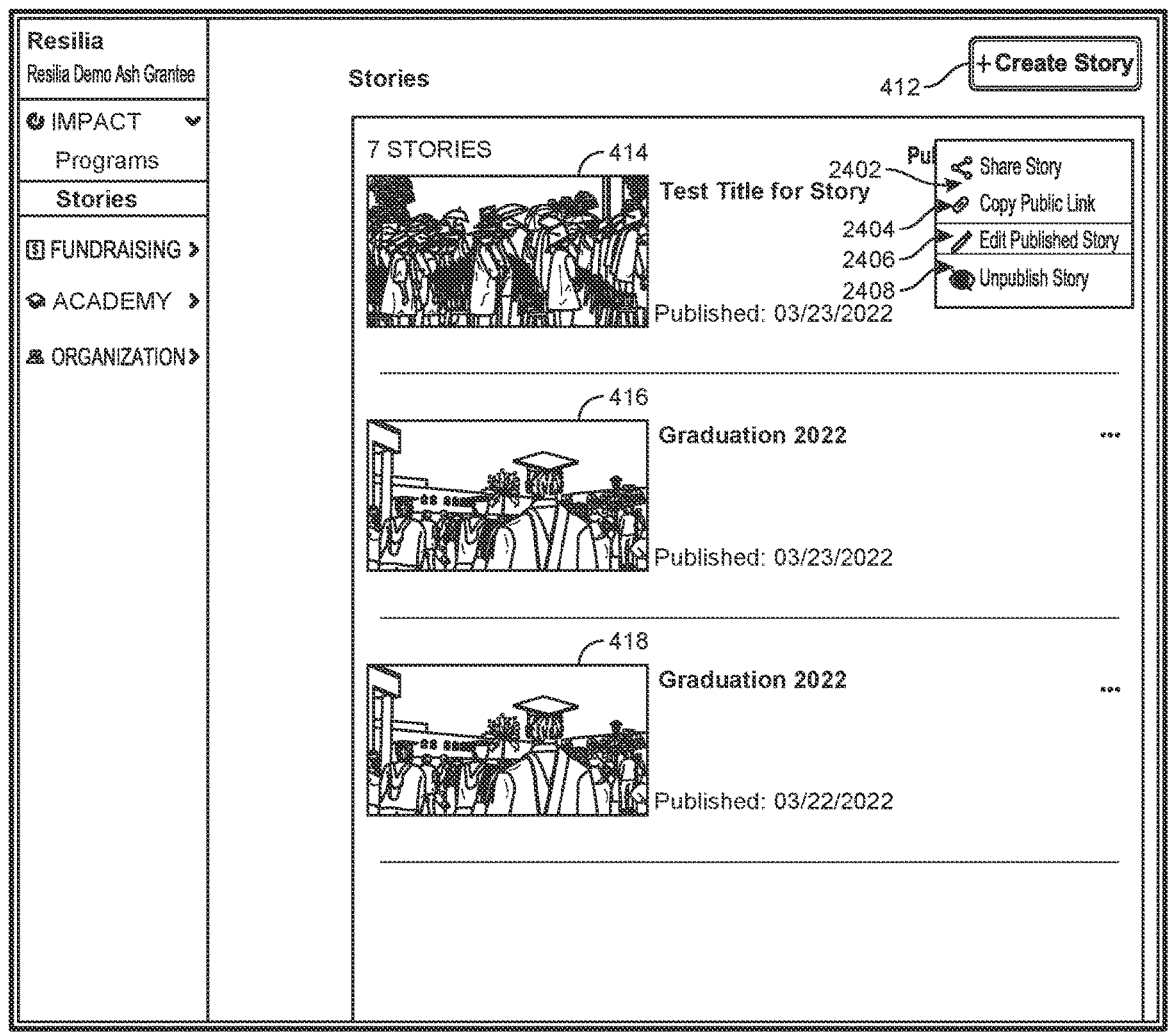
Figure 25:
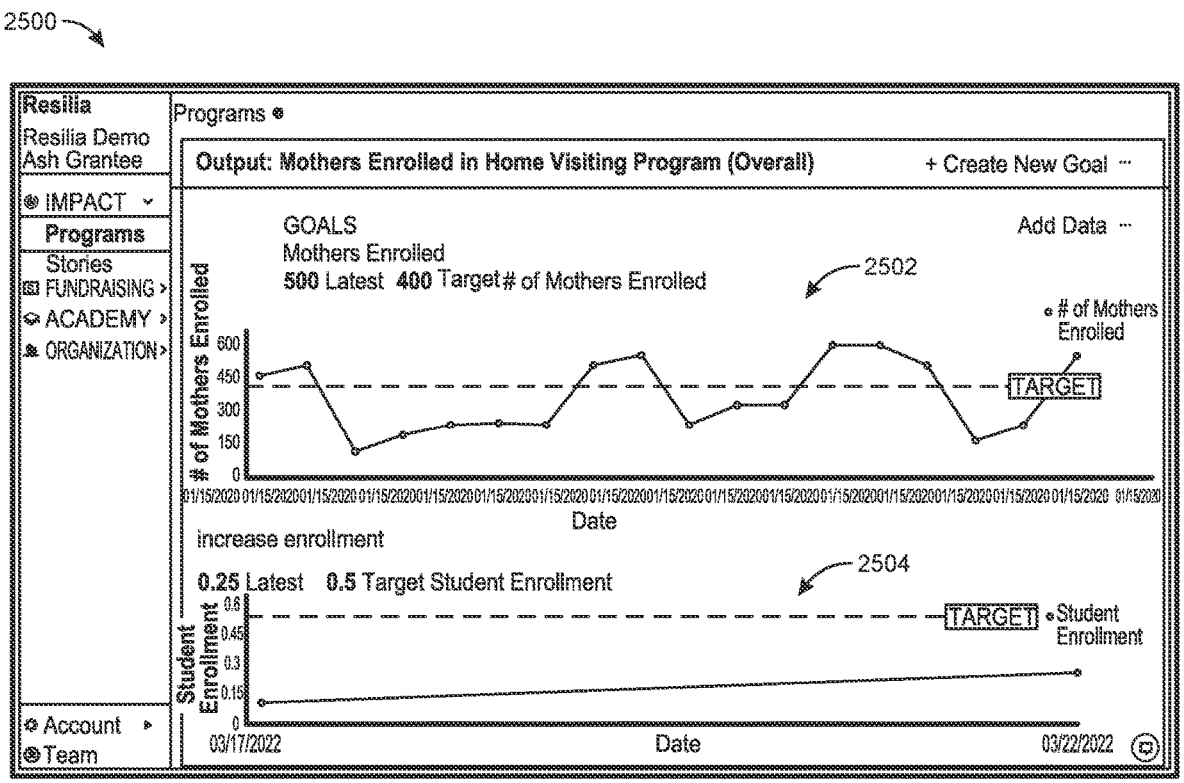

FIG. 24 shows another graphical user interface 2400, which may correspond to graphical user interface 400 discussed above in the context of FIG. 4, and which may be displayed in response to the user account selecting or toggling an appropriate user interface element, such as a user interface element 422 shown in FIG. 4. Upon selecting or toggling user interface element 422, the menu of graphical user interface 2400 may be displayed, which may further include user interface elements 2402-2408. These respective user interface elements may enable the user to share the corresponding metadata publication, share a public link to the metadata publication (e.g., a universally public link such as a uniform resource locator without privacy restrictions or paywall/gating functionality such that generally any user on the Internet may access the metadata publication simply by entering the uniform resource locator within a generic web browser), edit the metadata publication, and/or revoke a publication status of the metadata publication, etc. In particular, user interface element 2406 may enable the user account to perform simpler or more convenient editorial changes to the metadata publication. In summary, the discussion above regarding FIGS. 3-24 may generally correspond to functionality for a "builder," such as a story, narrative, and/or metadata publication builder.

In contrast, FIGS. 25-32 may generally describe functionality for a progress report, and the description of these figures may elaborate on the single-dimensional and/or multidimensional tracking functionality that is further discussed and described in the applications listed above and incorporated by reference herein to this particular application. Beginning with FIG. 25, this figure may show a graphical user interface 2500 for tracking the progress of a program user account, such as a non-profit organization, toward achieving a particular task or goal, as further discussed above. In particular, graph 2502 may display progress toward achieving a goal of enrolling a particular number of mothers within a home visiting program. As further shown in this graph, the latest information may indicate that 500 mothers may have been enrolled within the home visiting program, which may exceed the target goal of 400 mothers, as further shown in this figure. Graph 2504 may operate in a substantially similar or parallel manner.

Figure 26:
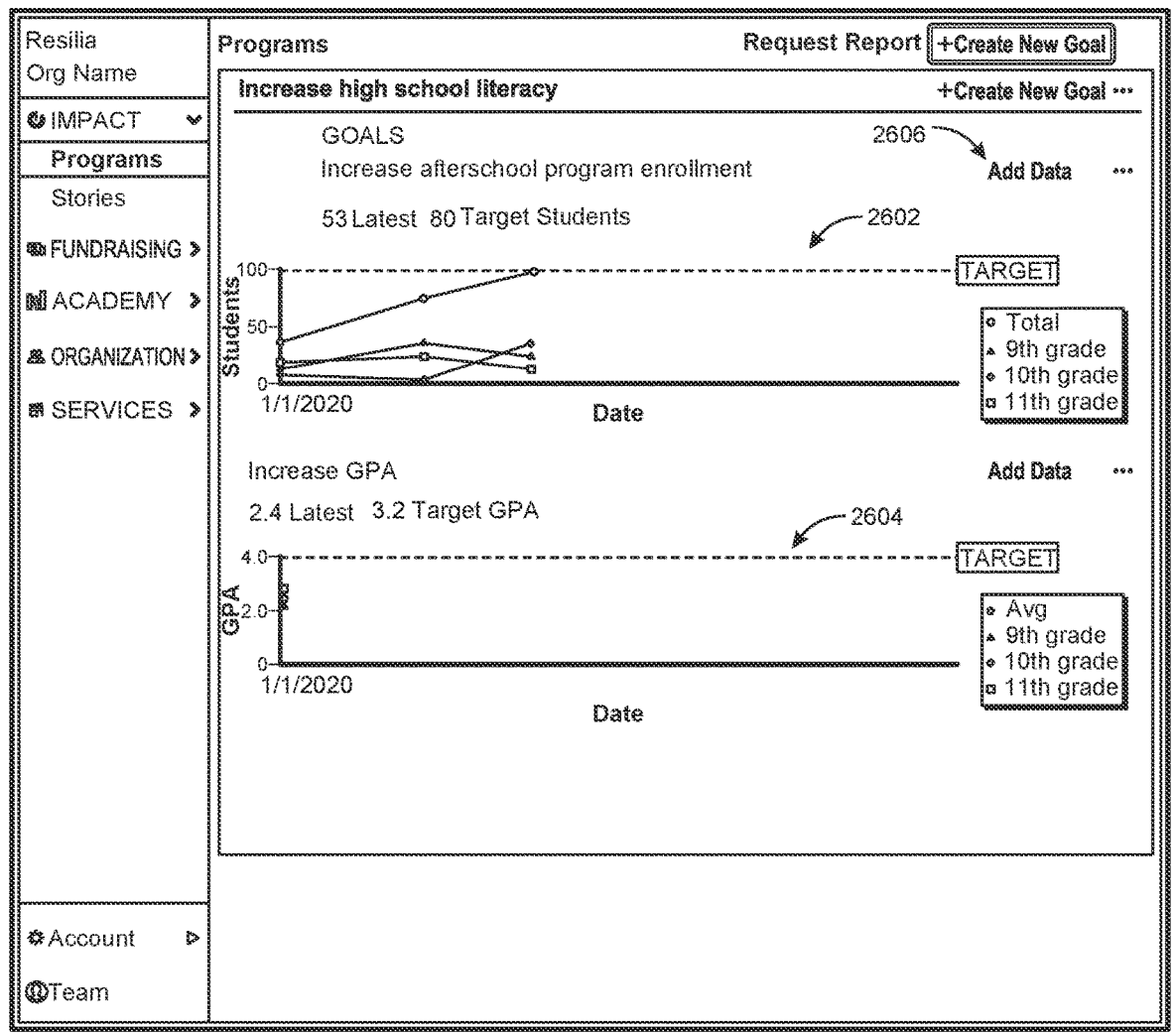

FIG. 26 shows another sequence step or transformation of the graphical user interface, in the form of a graphical user interface 2600, which may further include a graph 2602 and a graph 2604. Graph 2602 may further illustrate how four different variables are being measured across the graph along a horizontal axis that corresponds to a date or chronological progression of time. The four variables of this graph are merely illustrative, and in this particular case correspond to the total amount of increasing high school literacy, ninth-grade increase of high school literacy, tenth grade increase of high school literacy, and eleventh grade increase of high school literacy. Graph 2604 may operate in a substantially similar or parallel manner, but with a focus on increasing grade point average rather than increasing high school literacy.

Figure 27:
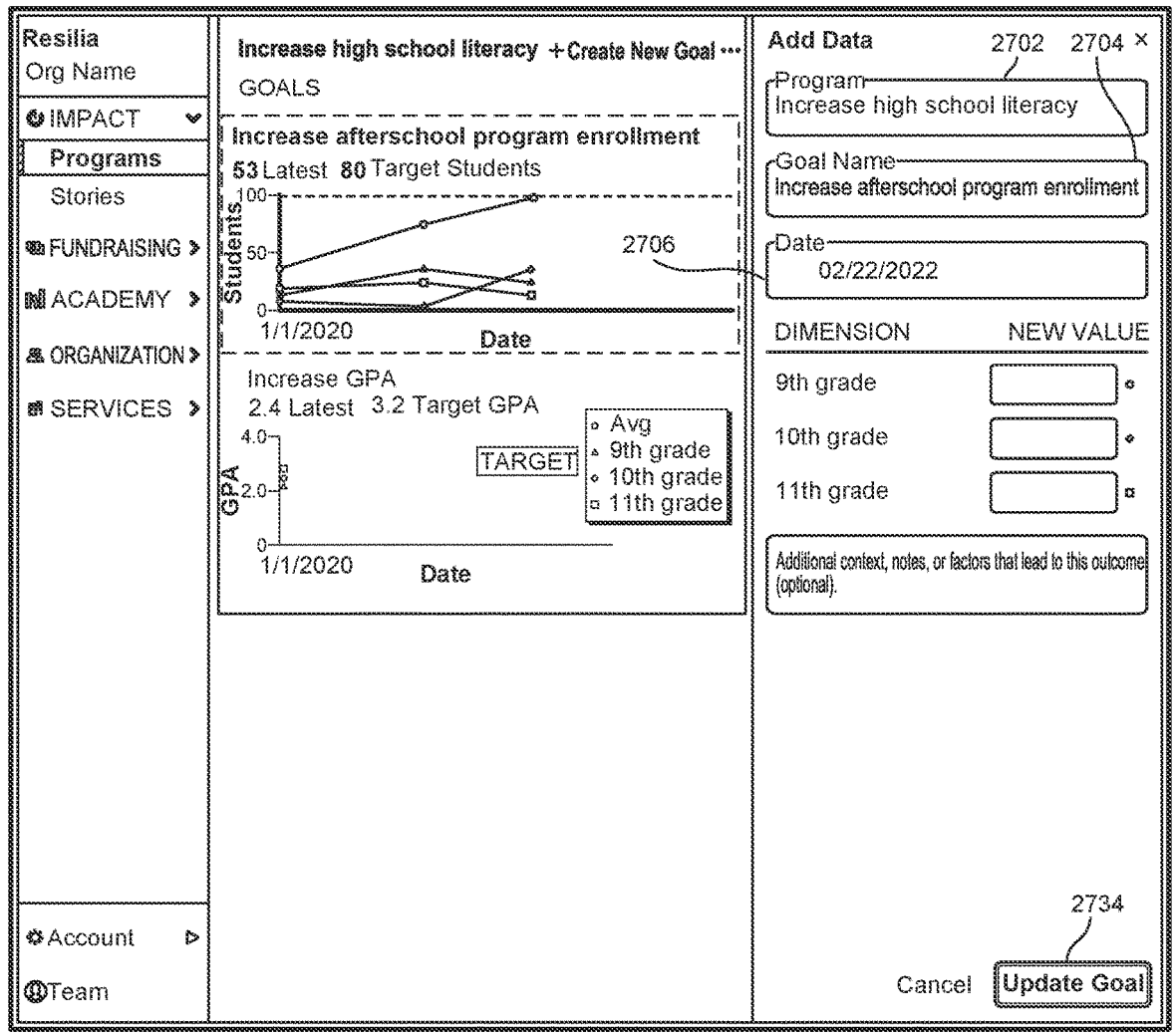

FIG. 27 shows another sequence step or transformation of the graphical user interface, in the form of a graphical user interface 2700, which may be displayed upon the user account entering an appropriate input, such as by selecting or toggling a user interface element 2606, which further specifies the ability for the user account to add data to a corresponding chart. As further shown in FIG. 27, graphical user interface 2700 may include multiple different fields, in the form of an overall wizard, which may enable the user account to specify values or otherwise input data to further update the corresponding graph. Graphical user interface 2700 may include a field 2702, a field 2704, and a field 2706, which may enable the user account to enter a name of the corresponding program, a text description of the corresponding goal or name of the goal, and a date corresponding to the measurement of the new values for the graph, which may be entered under the "NEW VALUE" column of graphical user interface 2700. Graphical user interface 2700 may also further include a user interface element 2734, which may enable the user to update the corresponding goal after having entered the corresponding updated values.

Figure 28:
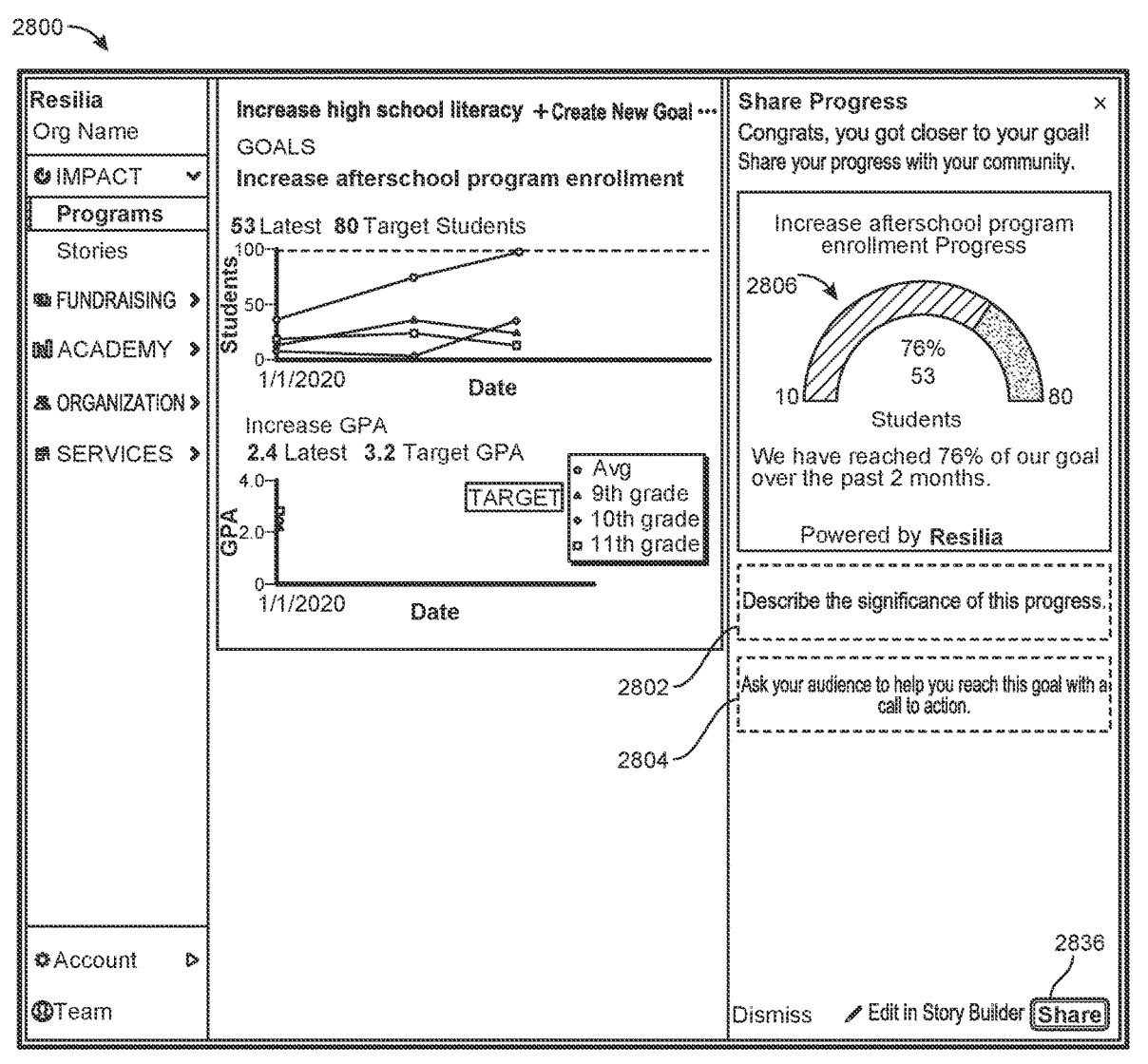

FIG. 28 shows another sequence step or transformation of the graphical user interface, in the form of a graphical user interface 2800, which may be displayed in response to the user account selecting or toggling an appropriate user interface element, such as user interface element 2734 in FIG. 27. Graphical user interface 2800 may further include a graphic 2806, which may report to a viewer a graphical representation of a measurement of progress toward achieving the corresponding goal. Graphical user interface 2800 may further include a field 2802 and/or a field 2804, which may enable the user account to enter text to describe the significance of the progress made toward achieving this particular goal and/or to enter text asking the audience to help the corresponding program user account to reach the goal with a call to action, which may solicit funding or other resources, as further discussed above. Graphical user interface 2800 may also include a user interface element 2836, such as a button, which may enable the user account to share graphic 2806 and/or the text entered into field 2802 and/or field 2804, in a manner that is analogous or parallel to the sharing functionality discussed above in connection with FIGS. 22-23, for example.

Figure 31:
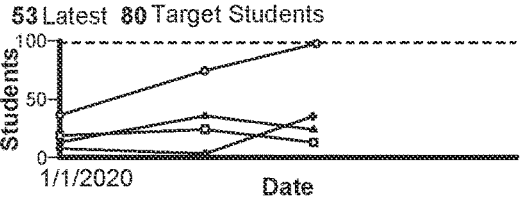
Figure 32:
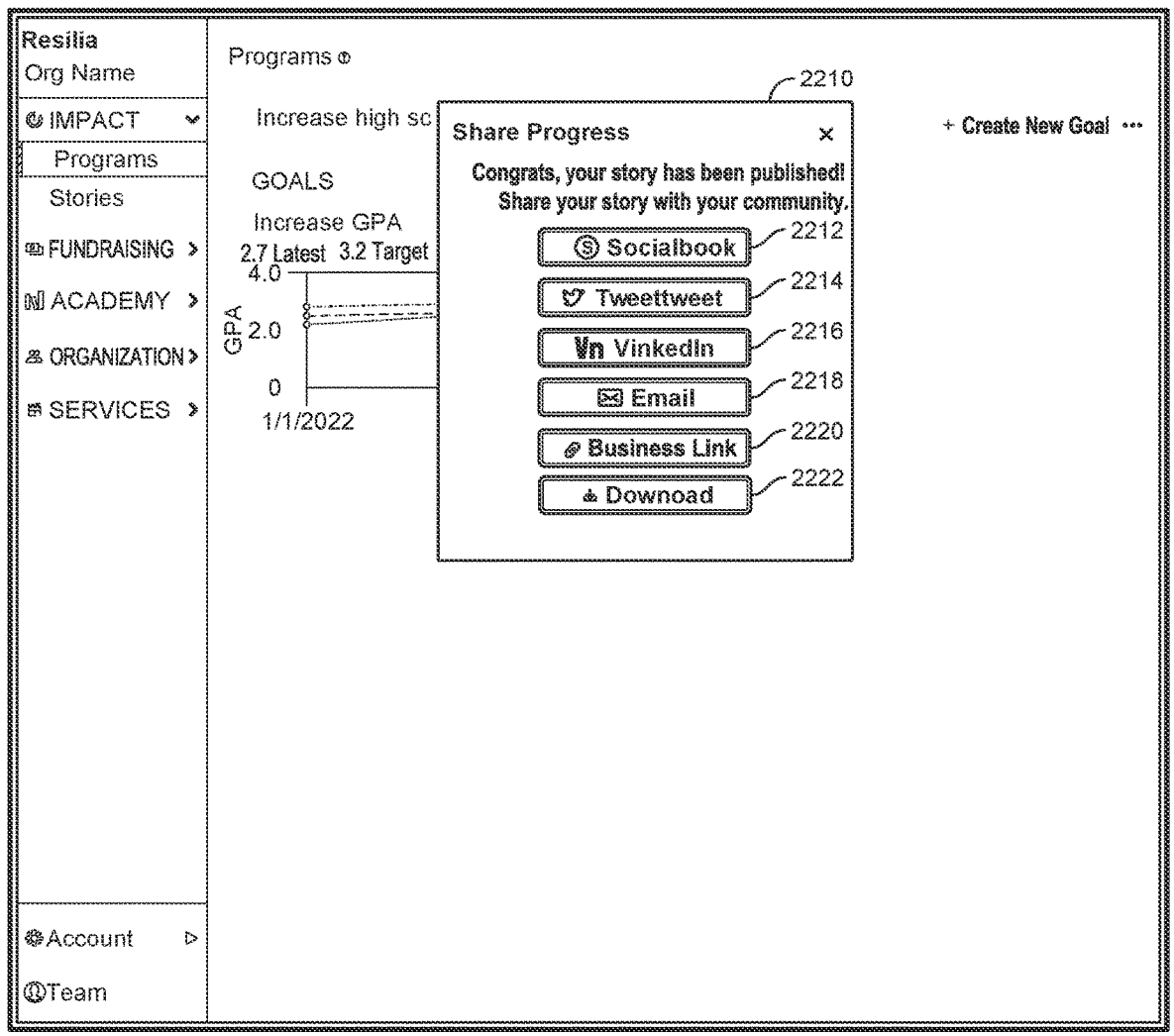

FIG. 29 shows an illustrative example of how the user account may populate one or more of the fields of graphical user interface 2800 by selecting or toggling a user interface element 2902, which may further trigger the displaying of an interface or wizard for selecting pre-existing or previously used items of text from a corresponding library, which may be analogous to the usage of various pre-existing libraries discussed above in connection with FIGS. 9-14, for example. Similarly, FIG. 30 shows another example of a library, in which case the library includes pre-existing examples of calls to action, and the functionality of the graphical user interface of this figure may be analogous or parallel to the library described above in connection with FIG. 19. FIG. 31 shows another example of the graphical user interface, which may be displayed in response to the user selecting one or more of the example calls to action from the graphical user interface of FIG. 30. The graphical user interface of FIG. 31 may further include a user interface element 3104, which may enable the user account to enter text to describe the corresponding metadata publication, as well as a user interface element 3102, which may enable another user account or viewer to enter an interface or wizard in order to donate, submit funds, or otherwise provide support for the corresponding initiative, as further discussed above. Lastly, FIG. 32 illustrates how the user account may select or toggle user interface element 3106 and the graphical user interface of FIG. 31 to thereby trigger sharing functionality that parallels the sharing functionality of FIG. 22, as further discussed above.

Figure 33:
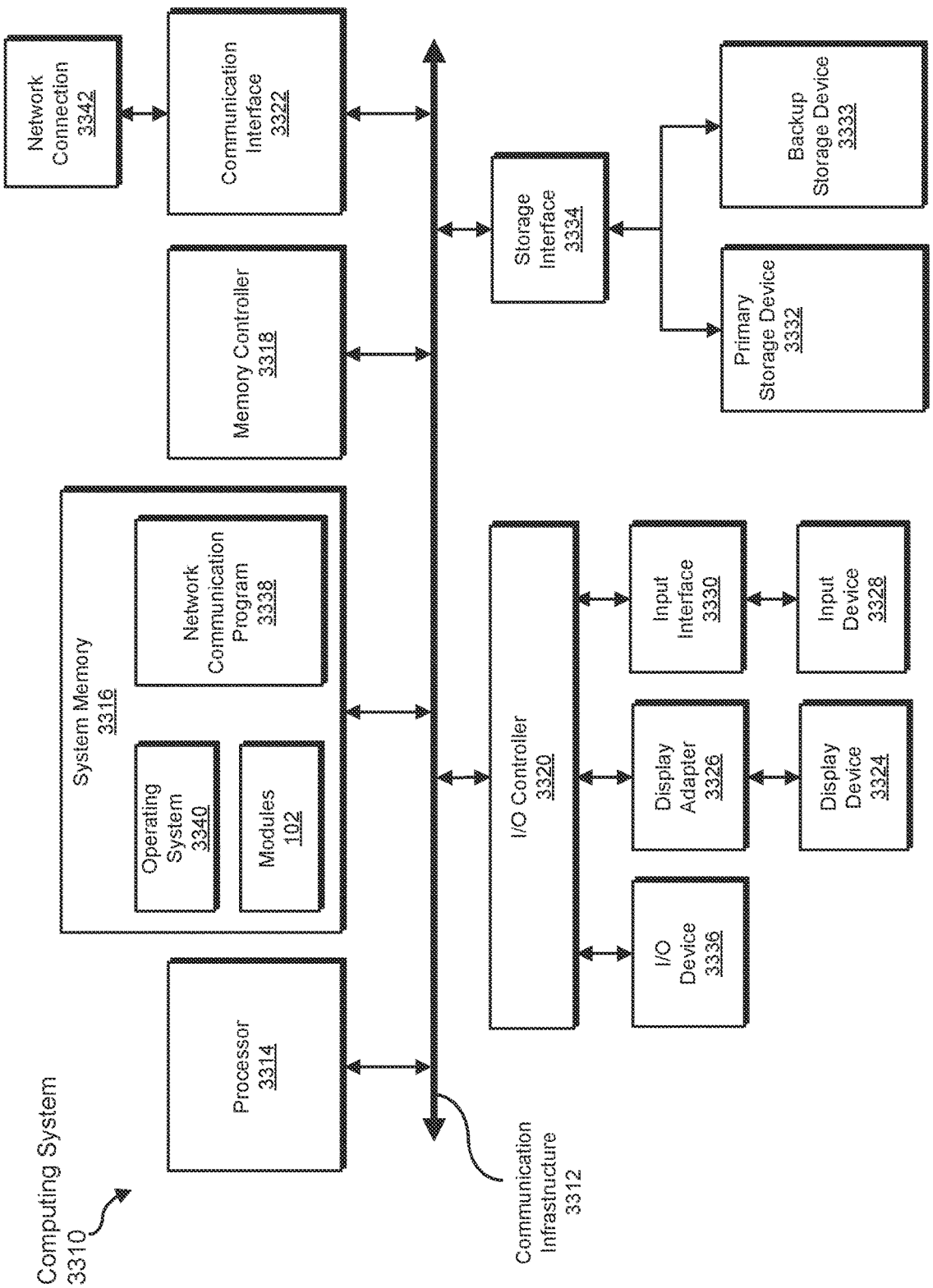
FIG. 33 is a block diagram of an example computing system capable of implementing one or more of the embodiments described and/or illustrated herein.

FIG. 33 is a block diagram of an example computing system 3310 capable of implementing one or more of the embodiments described and/or illustrated herein. For example, all or a portion of computing system 3310 may perform and/or be a means for performing, either alone or in combination with other elements, one or more of the steps described herein (such as one or more of the steps illustrated in FIG. 3). All or a portion of computing system 3310 may also perform and/or be a means for performing any other steps, methods, or processes described and/or illustrated herein.

Computing system 3310 broadly represents any single or multi-processor computing device or system capable of executing computer-readable instructions. Examples of computing system 3310 include, without limitation, workstations, laptops, client-side terminals, servers, distributed computing systems, handheld devices, or any other computing system or device. In its most basic configuration, computing system 3310 may include at least one processor 3314 and a system memory 3316.

Processor 3314 generally represents any type or form of physical processing unit (e.g., a hardware-implemented central processing unit) capable of processing data or interpreting and executing instructions. In certain embodiments, processor 3314 may receive instructions from a software application or module. These instructions may cause processor 3314 to perform the functions of one or more of the example embodiments described and/or illustrated herein.

System memory 3316 generally represents any type or form of volatile or non-volatile storage device or medium capable of storing data and/or other computer-readable instructions. Examples of system memory 3316 include, without limitation, Random Access Memory (RAM), Read Only Memory (ROM), flash memory, or any other suitable memory device. Although not required, in certain embodiments computing system 3310 may include both a volatile memory unit (such as, for example, system memory 3316) and a non-volatile storage device (such as, for example, primary storage device 3332, as described in detail below). In one example, one or more of modules 102 from FIG. 1 may be loaded into system memory 3316.

In some examples, system memory 3316 may store and/or load an operating system 3340 for execution by processor 3314. In one example, operating system 3340 may include and/or represent software that manages computer hardware and software resources and/or provides common services to computer programs and/or applications on computing system 3310. Examples of operating system 3340 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 3310 may also include one or more components or elements in addition to processor 3314 and system memory 3316. For example, as illustrated in FIG. 33, computing system 3310 may include a memory controller 3318, an Input/Output (I/O) controller 3320, and a communication interface 3322, each of which may be interconnected via a communication infrastructure 3312. Communication infrastructure 3312 generally represents any type or form of infrastructure capable of facilitating communication between one or more components of a computing device. Examples of communication infrastructure 3312 include, without limitation, a communication bus (such as an Industry Standard Architecture (ISA), Peripheral Component Interconnect (PCI), PCI Express (PCIe), or similar bus) and a network.

Memory controller 3318 generally represents any type or form of device capable of handling memory or data or controlling communication between one or more components of computing system 3310. For example, in certain embodiments memory controller 3318 may control communication between processor 3314, system memory 3316, and I/O controller 3320 via communication infrastructure 3312.

I/O controller 3320 generally represents any type or form of module capable of coordinating and/or controlling the input and output functions of a computing device. For example, in certain embodiments I/O controller 3320 may control or facilitate transfer of data between one or more elements of computing system 3310, such as processor 3314, system memory 3316, communication interface 3322, display adapter 3326, input interface 3330, and storage interface 3334.

As illustrated in FIG. 33, computing system 3310 may also include at least one display device 3324 coupled to I/O controller 3320 via a display adapter 3326. Display device 3324 generally represents any type or form of device capable of visually displaying information forwarded by display adapter 3326. Similarly, display adapter 3326 generally represents any type or form of device configured to forward graphics, text, and other data from communication infrastructure 3312 (or from a frame buffer, as known in the art) for display on display device 3324.

As illustrated in FIG. 33, example computing system 3310 may also include at least one input device 3328 coupled to I/O controller 3320 via an input interface 3330. Input device 3328 generally represents any type or form of input device capable of providing input, either computer or human generated, to example computing system 3310. Examples of input device 3328 include, without limitation, a keyboard, a pointing device, a speech recognition device, variations or combinations of one or more of the same, and/or any other input device.

Additionally or alternatively, example computing system 3310 may include additional I/O devices. For example, example computing system 3310 may include I/O device 3336. In this example, I/O device 3336 may include and/or represent a user interface that facilitates human interaction with computing system 3310. Examples of I/O device 3336 include, without limitation, a computer mouse, a keyboard, a monitor, a printer, a modem, a camera, a scanner, a microphone, a touchscreen device, variations or combinations of one or more of the same, and/or any other I/O device.

Communication interface 3322 broadly represents any type or form of communication device or adapter capable of facilitating communication between example computing system 3310 and one or more additional devices. For example, in certain embodiments communication interface 3322 may facilitate communication between computing system 3310 and a private or public network including additional computing systems. Examples of communication interface 3322 include, without limitation, a wired network interface (such as a network interface card), a wireless network interface (such as a wireless network interface card), a modem, and any other suitable interface. In at least one embodiment, communication interface 3322 may provide a direct connection to a remote server via a direct link to a network, such as the Internet. Communication interface 3322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 3322 may also represent a host adapter configured to facilitate communication between computing system 3310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 3322 may also allow computing system 3310 to engage in distributed or remote computing. For example, communication interface 3322 may receive instructions from a remote device or send instructions to a remote device for execution.

In some examples, system memory 3316 may store and/or load a network communication program 3338 for execution by processor 3314. In one example, network communication program 3338 may include and/or represent software that enables computing system 3310 to establish a network connection 3342 with another computing system (not illustrated in FIG. 33) and/or communicate with the other computing system by way of communication interface 3322. In this example, network communication program 3338 may direct the flow of outgoing traffic that is sent to the other computing system via network connection 3342. Additionally or alternatively, network communication program 3338 may direct the processing of incoming traffic that is received from the other computing system via network connection 3342 in connection with processor 3314.

Although not illustrated in this way in FIG. 33, network communication program 3338 may alternatively be stored and/or loaded in communication interface 3322. For example, network communication program 3338 may include and/or represent at least a portion of software and/or firmware that is executed by a processor and/or Application Specific Integrated Circuit (ASIC) incorporated in communication interface 3322.

As illustrated in FIG. 33, example computing system 3310 may also include a primary storage device 3332 and a backup storage device 3333 coupled to communication infrastructure 3312 via a storage interface 3334. Storage devices 3332 and 3333 generally represent any type or form of storage device or medium capable of storing data and/or other computer-readable instructions. For example, storage devices 3332 and 3333 may be a magnetic disk drive (e.g., a so-called hard drive), a solid state drive, a floppy disk drive, a magnetic tape drive, an optical disk drive, a flash drive, or the like. Storage interface 3334 generally represents any type or form of interface or device for transferring data between storage devices 3332 and 3333 and other components of computing system 3310.

In certain embodiments, storage devices 3332 and 3333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 3332 and 3333 may also include other similar structures or devices for allowing computer software, data, or other computer-readable instructions to be loaded into computing system 3310. For example, storage devices 3332 and 3333 may be configured to read and write software, data, or other computer-readable information. Storage devices 3332 and 3333 may also be a part of computing system 3310 or may be a separate device accessed through other interface systems.

Many other devices or subsystems may be connected to computing system 3310. Conversely, all of the components and devices illustrated in FIG. 33 need not be present to practice the embodiments described and/or illustrated herein. The devices and subsystems referenced above may also be interconnected in different ways from that shown in FIG. 33. Computing system 3310 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 3310. All or a portion of the computer program stored on the computer-readable medium may then be stored in system memory 3316 and/or various portions of storage devices 3332 and 3333. When executed by processor 3314, a computer program loaded into computing system 3310 may cause processor 3314 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 3310 may be configured as an Application Specific Integrated Circuit (ASIC) adapted to implement one or more of the example embodiments disclosed herein.

Figure 34:
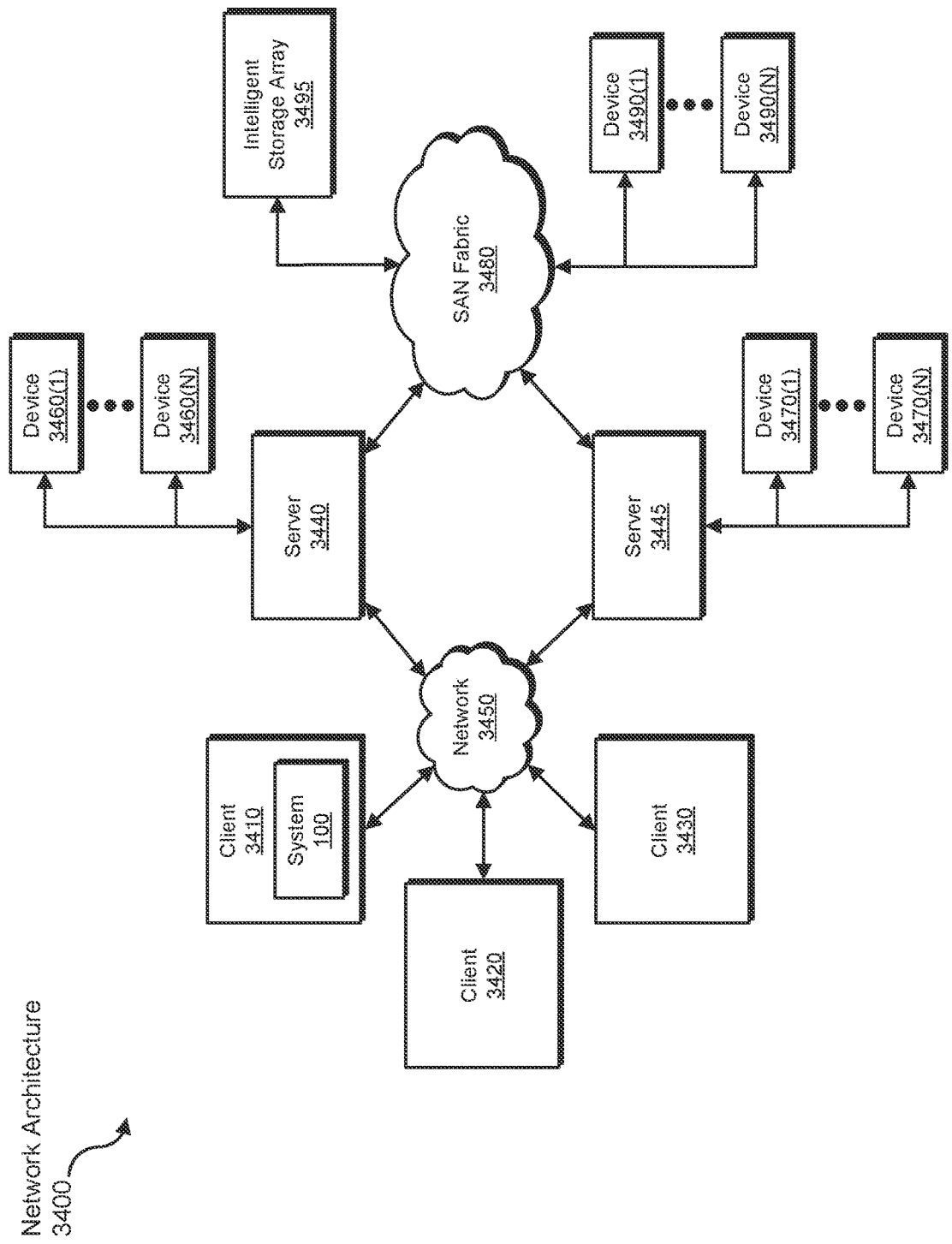
FIG. 34 is a block diagram of an example computing network capable of implementing one or more of the embodiments described and/or illustrated herein.

FIG. 34 is a block diagram of an example network architecture 3400 in which client systems 3410, 3420, and 3430 and servers 3440 and 3445 may be coupled to a network 3450. As detailed above, all or a portion of network architecture 3400 may perform and/or be a means for performing, either alone or in combination with other elements, one or more of the steps disclosed herein (such as one or more of the steps illustrated in FIG. 3). All or a portion of network architecture 3400 may also be used to perform and/or be a means for performing other steps and features set forth in the present disclosure.

Client systems 3410, 3420, and 3430 generally represent any type or form of computing device or system, such as example computing system 3310 in FIG. 33. Similarly, servers 3440 and 3445 generally represent computing devices or systems, such as application servers or database servers, configured to provide various database services and/or run certain software applications. Network 3450 generally represents any telecommunication or computer network including, for example, an intranet, a WAN, a LAN, a PAN, or the Internet. In one example, client systems 3410, 3420, and/or 3430 and/or servers 3440 and/or 3445 may include all or a portion of system 100 from FIG. 1.

As illustrated in FIG. 34, one or more storage devices 3460(1)-(N) may be directly attached to server 3440. Similarly, one or more storage devices 3470(1)-(N) may be directly attached to server 3445. Storage devices 3460(1)-(N) and storage devices 3470(1)-(N) generally represent any type or form of storage device or medium capable of storing data and/or other computer-readable instructions. In certain embodiments, storage devices 3460(1)-(N) and storage devices 3470(1)-(N) may represent Network-Attached Storage (NAS) devices configured to communicate with servers 3440 and 3445 using various protocols, such as Network File System (NFS), Server Message Block (SMB), or Common Internet File System (CIFS).

Servers 3440 and 3445 may also be connected to a Storage Area Network (SAN) fabric 3480. SAN fabric 3480 generally represents any type or form of computer network or architecture capable of facilitating communication between a plurality of storage devices. SAN fabric 3480 may facilitate communication between servers 3440 and 3445 and a plurality of storage devices 3490(1)-(N) and/or an intelligent storage array 3495. SAN fabric 3480 may also facilitate, via network 3450 and servers 3440 and 3445, communication between client systems 3410, 3420, and 3430 and storage devices 3490(1)-(N) and/or intelligent storage array 3495 in such a manner that devices 3490(1)-(N) and array 3495 appear as locally attached devices to client systems 3410, 3420, and 3430. As with storage devices 3460(1)-(N) and storage devices 3470(1)-(N), storage devices 3490(1)-(N) and intelligent storage array 3495 generally represent any type or form of storage device or medium capable of storing data and/or other computer-readable instructions.

In certain embodiments, and with reference to example computing system 3310 of FIG. 33, a communication interface, such as communication interface 3322 in FIG. 33, may be used to provide connectivity between each client system 3410, 3420, and 3430 and network 3450. Client systems 3410, 3420, and 3430 may be able to access information on server 3440 or 3445 using, for example, a web browser or other client software. Such software may allow client systems 3410, 3420, and 3430 to access data hosted by server 3440, server 3445, storage devices 3460(1)-(N), storage devices 3470(1)-(N), storage devices 3490(1)-(N), or intelligent storage array 3495. Although FIG. 34 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 3440, server 3445, storage devices 3460(1)-(N), storage devices 3470(1)-(N), storage devices 3490(1)-(N), intelligent storage array 3495, or any combination thereof. All or a portion of one or more of the example embodiments disclosed herein may also be encoded as a computer program, stored in server 3440, run by server 3445, and distributed to client systems 3410, 3420, and 3430 over network 3450.

As detailed above, computing system 3310 and/or one or more components of network architecture 3400 may perform and/or be a means for performing, either alone or in combination with other elements, the connecting of user accounts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smart watches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method, comprising:
aggregating, within a group network application, program user accounts registered to perform a respective task defined in a database of the group network application with resource user accounts registered as sources to provide resources for performance of the respective task;
provisioning an interface that enables a program user account to select a structure for a metadata publication from a set of predefined structures;
fulfilling at least part of the metadata publication based on an instruction from the program user account; and
publishing the metadata publication over a wide area network in accordance with the instruction from the program user account;

wherein:
each structure in the set of predefined structures specifies an order of instances of metadata publication elements selected from a set of metadata publication element data structures;
the set of metadata publication element data structures includes a text data structure, an image data structure, and a program user account request data structure; and
publishing the metadata publication over the wide area network includes publishing an interface element that corresponds to the program user account request data structure and that enables another user account to provide resources for performance of the respective task.

2. The method of claim 1, further comprising displaying to the program user account a list of previously published metadata publications.

3. The method of claim 1, wherein the set of structures includes a blank structure, a testimonial structure, an impact structure, a request specific structure, and a program update structure.

4. The method of claim 1, wherein the set of metadata publication element data structures further includes a reference data structure.

5. The method of claim 1, wherein the set of metadata publication element data structures further includes a video data structure.

6. The method of claim 1, wherein the set of metadata publication element data structures further includes a title data structure.

7. The method of claim 1, wherein the set of metadata publication element data structures further includes a header data structure.

8. The method of claim 1, wherein the interface enables the program user account to enter a title for the metadata publication.

9. The method of claim 8, wherein the interface provides a prompt that prompts the program user account to enter the title.

10. The method of claim 8, wherein the interface provides user interface elements that enable the program user account to enable or disable a header.

11. The method of claim 1, wherein the interface provides, after inserting one metadata publication element into the structure, a tool that enables the program user account to select from the set of metadata publication element data structures for insertion into another position into the metadata publication.

12. The method of claim 11, wherein the interface is configured such that, after the program user account toggles the tool, a list of the set of metadata publication element data structures is displayed.

13. The method of claim 1, wherein:
the interface enables the program user account to select the image data structure;
the interface displays an image insertion element; and
the interface enables, in response to selection of the image insertion element, a sub-interface that enables the program user account to select a corresponding image.

14. The method of claim 13, wherein the sub-interface enables the program user account to select the corresponding image from a preexisting library of images.

15. The method of claim 1, wherein the interface enables the program user account to select the program user account request data structure.

16. The method of claim 1, wherein:
the interface enables the program user account to select a reference data structure;
the interface is configured to display a text insertion element that enables the program user account to insert text corresponding to a reference; and
the interface is configured to display a prompt that prompts the program user account to enter the text corresponding to the reference.

17. The method of claim 16, wherein the reference data structure specifies at least two of a quotation field, an author field, and a role field.

18. The method of claim 16, wherein the text is selected from a preexisting library of references.

19. A system, comprising:
an aggregation module, stored in a memory, that aggregates, within a group network application, program user accounts registered to perform a respective task defined in a database of the group network application with resource user accounts registered as sources to provide resources for performance of the respective task;
a provisioning module, stored in the memory, that provisions an interface that enables a program user account to select a structure for a metadata publication from a set of predefined structures;
a fulfillment module, stored in the memory, that fulfills at least part of the metadata publication based on an instruction from the program user account;
a publishing module, stored in the memory, that publishes the metadata publication over a wide area network in accordance with the instruction from the program user account; and
at least one physical processor configured to execute the aggregation module, the provisioning module, the fulfillment module, and the publishing module; wherein:
each structure in the set of predefined structures specifies an order of instances of metadata publication elements selected from a set of metadata publication element data structures;
the set of metadata publication element data structures includes a text data structure, an image data structure, and a program user account request data structure; and
publishing the metadata publication over the wide area network includes publishing an interface element that corresponds to the program user account request data structure and that enables another user account to provide resources for performance of the respective task.

20. A non-transitory computer-readable medium storing computer-executable instructions that, when executed by at least one physical processor of a computing device, cause the computing device to perform a method comprising:
aggregating, within a group network application, program user accounts registered to perform a respective task defined in a database of the group network application with resource user accounts registered as sources to provide resources for performance of the respective task;
provisioning an interface that enables a program user account to select a structure for a metadata publication from a set of predefined structures;
fulfilling at least part of the metadata publication based on an instruction from the program user account; and
publishing the metadata publication over a wide area network in accordance with the instruction from the program user account;

wherein:

each structure in the set of predefined structures specifies an order of instances of metadata publication elements selected from a set of metadata publication element data structures;

the set of metadata publication element data structures includes a text data structure, an image data structure, and a program user account request data structure; and publishing the metadata publication over the wide area network includes publishing an interface element that corresponds to the program user account request data structure and that enables another user account to provide resources for performance of the respective task.

* * * * *